United States Patent
Shalhon Livne et al.

(10) Patent No.: US 12,423,813 B2
(45) Date of Patent: Sep. 23, 2025

(54) SYSTEM AND METHOD FOR MACHINE-LEARNING BASED SENSOR ANALYSIS AND VASCULAR TREE SEGMENTATION

(71) Applicant: Cathworks Ltd., Kfar Saba (IL)

(72) Inventors: Moran Shalhon Livne, Rosh HaAyin (IL); Avishai Baruch Yaari, Hod-HaSharon (IL); Hila Blecher Segev, Ramat Ishai (IL); Tomer Shapira, Ra'anana (IL); Ori Ahron Noked Partouche, Ramat Gan (IL)

(73) Assignee: Cathworks Ltd., Kfar Saba (IL)

( * ) Notice: Subject to any disclaimer, the term of this patent is extended or adjusted under 35 U.S.C. 154(b) by 0 days.

(21) Appl. No.: 18/477,466

(22) Filed: Sep. 28, 2023

(65) Prior Publication Data
US 2024/0029259 A1    Jan. 25, 2024

Related U.S. Application Data

(63) Continuation of application No. PCT/IB2023/051186, filed on Feb. 9, 2023.
(Continued)

(51) Int. Cl.
*G06V 10/764* (2022.01)
*G06T 7/00* (2017.01)
(Continued)

(52) U.S. Cl.
CPC .......... *G06T 7/0012* (2013.01); *G06T 7/0016* (2013.01); *G06T 7/11* (2017.01);
(Continued)

(58) Field of Classification Search
CPC ......... G06T 2207/30101; G06T 7/0012; G06T 7/11; G06T 2207/20081;
(Continued)

(56) References Cited

U.S. PATENT DOCUMENTS

| | | | |
|---|---|---|---|
| 5,150,292 A | 9/1992 | Hoffmann et al. | |
| 5,638,823 A | 6/1997 | Akay et al. | |

(Continued)

FOREIGN PATENT DOCUMENTS

| | | |
|---|---|---|
| CN | 104282009 | 1/2015 |
| CN | 113837985 | 12/2021 |

(Continued)

OTHER PUBLICATIONS

Abraham et al., "Alternative routes in road networks", ACM Journal of Experimental Algorithmics, Association of Computing Machinery, vol. 18(1):1.3:2-1.3:17 (2013).

(Continued)

*Primary Examiner* — Tsung Yin Tsai
(74) *Attorney, Agent, or Firm* — Knobbe, Martens, Olson & Bear, LLP

(57) ABSTRACT

Methods for automated identification of vascular features are described. In some embodiments, one or more machine learning (ML)-based vascular classifiers are used, with their results being combined to with results of at least one other vascular classifier in order to produce the final results. Potentially advantages of this approach include the ability to combine certain strengths of ML classifiers with segmentation approaches based on more classical ("formula-based") methods. These strengths may include particularly the identification of anatomically identified targets mixed within an image also showing similar looking but anatomically distinct targets.

24 Claims, 15 Drawing Sheets

Related U.S. Application Data

(60) Provisional application No. 63/308,550, filed on Feb. 10, 2022.

(51) Int. Cl.
*G06T 7/11* (2017.01)
*G06T 7/33* (2017.01)
*G06T 7/62* (2017.01)

(52) U.S. Cl.
CPC .................. *G06T 7/33* (2017.01); *G06T 7/62* (2017.01); *G06V 10/764* (2022.01); *G06T 2207/20081* (2013.01); *G06T 2207/20084* (2013.01); *G06T 2207/30048* (2013.01); *G06T 2207/30101* (2013.01); *G06T 2207/30168* (2013.01)

(58) Field of Classification Search
CPC . G06T 2207/20084; G06T 2207/10116; G06T 2207/10081; G06T 2207/10088; G06T 2207/20096; G06T 2207/30104; G06T 2207/30048; G06T 7/187; G06T 7/0016; G06T 2207/20076; G06T 7/12; G06T 2207/30168; G06T 7/149; G06T 7/194; G06T 7/60; G06T 7/62; G06T 2200/24; G06T 2207/10016; G06T 2207/10072; G06T 2207/10132; G06T 5/77; G06T 7/0014; G06T 7/10; G06T 7/32; G06T 2207/30172; G06T 5/00; G06T 11/60; G06T 2207/10104; G06T 2207/10108; G06T 2207/20021; G06T 2207/20104; G06T 3/40; G06T 7/174; G06T 7/344; G06T 1/0007; G06T 2200/04; G06T 2207/10012; G06T 2207/10024; G06T 2207/10068; G06T 2207/10101; G06T 2207/10121; G06T 2207/10124; G06T 2207/10136; G06T 2207/20016; G06T 2207/20048; G06T 2207/20072; G06T 2207/20132; G06T 2207/20156; G06T 2207/20221; G06T 2207/30008; G06T 2207/30016; G06T 2207/30021; G06T 2207/30041; G06T 2207/30061; G06T 2207/30084; G06T 2207/30092; G06T 2207/30096; G06T 5/70; G06T 5/90; G06T 7/136; G06T 7/254; G06T 7/30; G06T 7/33; G06T 7/70; G06T 7/74; G06T 7/90; G16H 30/40; G16H 50/20; G16H 50/50; G16H 50/30; G16H 50/70; G16H 20/40; G16H 30/20; G16H 10/00; G16H 40/67; G16H 10/60; G16H 30/00; G16H 40/63; A61B 6/504; A61B 6/5217; A61B 6/481; A61B 6/467; A61B 6/469; A61B 6/5258; A61B 5/02007; A61B 2576/02; A61B 5/021; A61B 5/026; A61B 5/0285; A61B 5/7264; A61B 6/4441; A61B 6/487; A61B 6/507; A61B 6/5205; A61B 6/5235; A61B 6/032; A61B 6/12; A61B 6/486; A61B 8/5223; A61B 34/20; A61B 6/468; A61B 8/06; A61B 8/0841; A61B 8/0891; A61B 8/12; A61B 2034/105; A61B 2034/107; A61B 2034/2065; A61B 2576/023; A61B 34/10; A61B 5/00; A61B 5/0033; A61B 5/0066; A61B 5/0073; A61B 5/055; A61B 5/061; A61B 5/6852; A61B 6/00; A61B 6/03; A61B 6/461; A61B 6/463; A61B 6/503; A61B 6/5211; A61B 8/04; A61B 8/085; A61B 8/0883; A61B 8/14; A61B 8/4254; A61B 8/4416; A61B 8/4483; A61B 8/5261; A61B 8/5269; A61B 8/5276; A61B 8/5284; G06N 3/08; G06N 3/084; G06N 3/045; G06N 20/10; G06N 3/04; G06N 20/00; G06N 20/20; G06N 3/02; G06N 3/044; G06N 3/0464; G06N 3/09; G06V 10/457; G06V 10/25; G06V 10/44; G06V 10/993; G06V 10/764; G06V 10/82; G06V 10/774; G06V 10/806; G06V 10/26; G06V 10/42; G06V 10/761; G06V 10/7715; G06V 40/14; G06F 18/2135; G06F 18/23213; G06F 18/2411; G06F 18/24143; G06F 18/253; G16Z 99/00

See application file for complete search history.

(56) References Cited

U.S. PATENT DOCUMENTS

| | | | |
|---|---|---|---|
| 6,047,080 | A | 4/2000 | Chen et al. |
| 6,186,948 | B1 | 2/2001 | Kamiyama et al. |
| 6,236,878 | B1 | 5/2001 | Taylor et al. |
| 6,501,848 | B1 | 12/2002 | Carroll et al. |
| 6,842,638 | B1 | 1/2005 | Suri et al. |
| 7,113,623 | B2 | 9/2006 | Chen et al. |
| 7,339,585 | B2 | 3/2008 | Verstraelen et al. |
| 7,369,691 | B2 | 5/2008 | Kondo et al. |
| 7,574,026 | B2 | 8/2009 | Rasche et al. |
| 7,657,299 | B2 | 2/2010 | Huizenga et al. |
| 7,693,315 | B2 | 4/2010 | Krishnan et al. |
| 7,738,626 | B2 | 6/2010 | Weese et al. |
| 7,808,503 | B2 | 10/2010 | Duluk, Jr. et al. |
| 7,860,283 | B2 | 12/2010 | Begelman et al. |
| 7,864,997 | B2 | 1/2011 | Aben |
| 7,912,260 | B2 | 3/2011 | Breeuwer et al. |
| 7,970,187 | B2 | 6/2011 | Puts et al. |
| 7,983,459 | B2 | 7/2011 | Begelman et al. |
| 8,073,224 | B2 | 12/2011 | Strobel et al. |
| 8,086,000 | B2 | 12/2011 | Weijers et al. |
| 8,090,164 | B2 | 1/2012 | Bullitt et al. |
| 8,155,411 | B2 | 4/2012 | Hof et al. |
| 8,298,147 | B2 | 10/2012 | Huennekens et al. |
| 8,311,748 | B2 | 11/2012 | Taylor et al. |
| 8,311,750 | B2 | 11/2012 | Taylor |
| 8,315,812 | B2 | 11/2012 | Taylor |
| 8,321,150 | B2 | 11/2012 | Taylor |
| 8,331,314 | B2 | 12/2012 | Quiang et al. |
| 8,496,594 | B2 | 7/2013 | Taylor et al. |
| 8,523,779 | B2 | 9/2013 | Taylor et al. |
| 8,548,778 | B1 | 10/2013 | Hart et al. |
| 8,554,490 | B2 | 10/2013 | Tang et al. |
| 8,560,968 | B1 | 10/2013 | Nair |
| 8,715,184 | B2 | 5/2014 | Lazebnik |
| 8,768,669 | B1 | 7/2014 | Hart et al. |
| 8,771,195 | B2 | 7/2014 | Kim et al. |
| 8,787,641 | B2 | 7/2014 | Hof et al. |
| 8,812,246 | B2 | 8/2014 | Taylor |
| 8,824,752 | B1 | 9/2014 | Fonte et al. |
| 8,837,860 | B1 | 9/2014 | Grady et al. |
| 8,861,820 | B2 | 10/2014 | Fonte et al. |
| 8,917,925 | B1 | 12/2014 | Grady et al. |
| 8,934,686 | B2 | 1/2015 | Ostrovsky-Berman et al. |
| 8,970,578 | B2 | 3/2015 | Voros et al. |
| 9,008,405 | B2 | 4/2015 | Fonte et al. |
| 9,042,611 | B2 | 5/2015 | Blezek et al. |
| 9,042,613 | B2 | 5/2015 | Spilker et al. |
| 9,070,214 | B1 | 6/2015 | Grady et al. |
| 9,078,564 | B2 | 7/2015 | Taylor |
| 9,087,147 | B1 | 7/2015 | Fonte |
| 9,129,418 | B2 | 9/2015 | Schormans et al. |
| 9,138,147 | B2 | 9/2015 | Schmitt et al. |
| 9,153,047 | B1 | 10/2015 | Grady et al. |
| 9,189,600 | B2 | 11/2015 | Spilker et al. |

(56) References Cited

U.S. PATENT DOCUMENTS

| | | |
|---|---|---|
| 9,256,936 B2 | 2/2016 | Jacobs et al. |
| 9,314,584 B1 | 4/2016 | Riley et al. |
| 9,375,191 B2 | 6/2016 | Verstraelen et al. |
| 9,406,141 B2 | 8/2016 | Kelm et al. |
| 9,430,827 B2 | 8/2016 | Kelm et al. |
| 9,466,117 B2 | 10/2016 | Habets et al. |
| 9,471,999 B2 | 10/2016 | Ishii et al. |
| 9,572,495 B2 | 2/2017 | Schmitt et al. |
| 9,576,360 B2 | 2/2017 | Schormans et al. |
| 9,613,186 B2 | 4/2017 | Fonte |
| 9,615,755 B2 | 4/2017 | Riley et al. |
| 9,633,454 B2 | 4/2017 | Lauritsch et al. |
| 9,646,361 B2 | 5/2017 | Koo et al. |
| 9,706,925 B2 | 7/2017 | Taylor |
| 9,743,835 B2 | 8/2017 | Taylor |
| 9,754,082 B2 | 9/2017 | Taylor et al. |
| 9,786,068 B2 | 10/2017 | Ishii et al. |
| 9,801,689 B2 | 10/2017 | Taylor |
| 9,805,465 B2 | 10/2017 | Kyriakou |
| 9,814,433 B2 | 11/2017 | Benishti et al. |
| 9,858,387 B2 | 1/2018 | Lavi et al. |
| 9,870,634 B2 | 1/2018 | Grady et al. |
| 9,888,896 B2 | 2/2018 | Lauritsch et al. |
| 9,934,566 B2 | 4/2018 | Sun et al. |
| 9,940,736 B2 | 4/2018 | Ishii et al. |
| 9,943,233 B2 | 4/2018 | Lavi et al. |
| 9,965,873 B2 | 5/2018 | Grady et al. |
| 9,968,256 B2 | 5/2018 | Taokowsky et al. |
| 9,977,869 B2 | 5/2018 | Lavi et al. |
| 9,999,361 B2 | 6/2018 | Sharma et al. |
| 10,141,074 B2 | 11/2018 | Lavi et al. |
| 10,143,390 B2 | 12/2018 | Ledoux et al. |
| 10,159,529 B2 | 12/2018 | Taylor |
| 10,176,575 B2 | 1/2019 | Isgum et al. |
| 10,210,956 B2 | 2/2019 | Lavi et al. |
| 10,219,704 B2 | 3/2019 | Lavi et al. |
| 10,229,516 B2 | 3/2019 | Aben et al. |
| 10,235,796 B2 | 3/2019 | Aben et al. |
| 10,245,001 B2 | 4/2019 | Redel et al. |
| 10,342,442 B2 | 7/2019 | Hattangadi et al. |
| 10,354,744 B2 | 7/2019 | Sharma et al. |
| 10,360,674 B2 | 7/2019 | Contini et al. |
| 10,363,018 B2 | 7/2019 | Fukuda et al. |
| 10,373,700 B2 | 8/2019 | Sharma et al. |
| 10,376,165 B2 | 8/2019 | Lavi et al. |
| 10,395,366 B2 | 8/2019 | Isgum et al. |
| 10,395,774 B2 | 8/2019 | Lavi et al. |
| 10,420,610 B2 | 9/2019 | Bai et al. |
| 10,424,063 B2 | 9/2019 | Lavi et al. |
| 10,441,235 B2 | 10/2019 | Lavi et al. |
| 10,441,239 B2 | 10/2019 | Abe |
| 10,456,094 B2 | 10/2019 | Fonte et al. |
| 10,463,336 B2 | 11/2019 | Itu et al. |
| 10,470,730 B2 | 11/2019 | Benishti et al. |
| 10,559,388 B2 | 2/2020 | Lavi et al. |
| 10,580,141 B2 | 3/2020 | Freiman et al. |
| 10,580,526 B2 | 3/2020 | Ma et al. |
| 10,595,807 B2 | 3/2020 | Lavi et al. |
| 10,631,737 B2 | 4/2020 | Lavi et al. |
| 10,636,146 B2 | 4/2020 | Zhong et al. |
| 10,650,522 B2 | 5/2020 | Hoi et al. |
| 10,682,180 B2 | 6/2020 | Taylor |
| 10,699,407 B2 | 6/2020 | Isgum et al. |
| 10,702,339 B2 | 7/2020 | Taylor |
| 10,733,792 B2 | 8/2020 | Aben et al. |
| 10,740,961 B2 | 8/2020 | Reiber et al. |
| 10,748,285 B2 | 8/2020 | Igarashi et al. |
| 10,758,200 B2 | 9/2020 | Passerini et al. |
| 10,776,988 B2 | 9/2020 | Grady et al. |
| 10,803,994 B2 | 10/2020 | Lavi et al. |
| 10,803,995 B2 | 10/2020 | Sharma et al. |
| 10,828,109 B2 | 11/2020 | Redel |
| 10,854,329 B2 | 12/2020 | Mohr et al. |
| 10,964,017 B2 | 3/2021 | Pack et al. |
| 10,964,071 B2 | 3/2021 | Grady et al. |
| 11,004,198 B2 | 5/2021 | Isgum et al. |
| 11,017,531 B2 | 5/2021 | Harish et al. |
| 11,031,136 B2 | 6/2021 | Grass et al. |
| 11,051,779 B2 | 7/2021 | Turca et al. |
| 11,055,845 B2 | 7/2021 | Nickisch et al. |
| 11,076,770 B2 | 8/2021 | Lavi et al. |
| 11,081,237 B2 | 8/2021 | Lavi et al. |
| 11,083,377 B2 | 8/2021 | Bouwman et al. |
| 11,083,524 B2 | 8/2021 | Taylor |
| 11,087,884 B2 | 8/2021 | Sankaran et al. |
| 11,090,118 B2 | 8/2021 | Taylor |
| 11,116,575 B2 | 9/2021 | Taylor |
| 11,127,503 B2 | 9/2021 | Rabbat et al. |
| 11,138,733 B2 | 10/2021 | Lavi et al. |
| 11,141,123 B2 | 10/2021 | Homann et al. |
| 11,160,524 B2 | 11/2021 | Lavi et al. |
| 11,179,043 B2 | 11/2021 | Haase et al. |
| 11,185,368 B2 | 11/2021 | Spilker et al. |
| 11,195,278 B2 | 12/2021 | Nickisch et al. |
| 11,202,612 B2 | 12/2021 | Sakaguchi |
| 11,216,944 B2 | 1/2022 | Reiber et al. |
| 11,272,845 B2 | 3/2022 | Cheline et al. |
| 11,278,208 B2 | 3/2022 | Lavi et al. |
| 11,282,170 B2 | 3/2022 | Gauriau et al. |
| 11,288,811 B2 | 3/2022 | Tu et al. |
| 11,288,813 B2 | 3/2022 | Grady et al. |
| 11,295,864 B2 | 4/2022 | Benishti et al. |
| 11,298,187 B2 | 4/2022 | Taylor |
| 11,304,665 B2 | 4/2022 | Sharma et al. |
| 11,308,621 B2 | 4/2022 | Tu et al. |
| 11,328,824 B2 | 5/2022 | Fonte |
| 11,341,631 B2 | 5/2022 | Song et al. |
| 11,375,904 B2 | 7/2022 | Igarashi |
| 11,382,569 B2 | 7/2022 | Grady et al. |
| 11,389,130 B2 | 7/2022 | Itu et al. |
| 11,398,029 B2 | 7/2022 | Grady et al. |
| 11,406,337 B2 | 8/2022 | Lavi et al. |
| 11,406,339 B2 | 8/2022 | Mistretta et al. |
| 11,409,422 B2 | 8/2022 | Olivan Bescos et al. |
| 11,410,308 B2 | 8/2022 | Gulsun et al. |
| 11,423,532 B2 | 8/2022 | Takahashi et al. |
| 11,424,036 B2 | 8/2022 | Fonte et al. |
| 11,424,038 B2 | 8/2022 | Grady et al. |
| 11,443,428 B2 | 9/2022 | Petersen et al. |
| 11,445,923 B2 | 9/2022 | Tu et al. |
| 11,462,326 B2 | 10/2022 | Wang et al. |
| 11,462,329 B2 | 10/2022 | Rabbat et al. |
| 11,468,567 B2 | 10/2022 | Groth et al. |
| 11,482,339 B2 | 10/2022 | Koo et al. |
| 11,490,867 B2 | 11/2022 | Homann et al. |
| 11,494,904 B2 | 11/2022 | Fonte et al. |
| 11,495,357 B2 | 11/2022 | Ma et al. |
| 11,501,485 B2 | 11/2022 | Grady et al. |
| 11,508,460 B2 | 11/2022 | Wang et al. |
| 11,510,587 B2 | 11/2022 | Kristanto et al. |
| 11,521,755 B2 | 12/2022 | Taylor et al. |
| 11,523,744 B2 | 12/2022 | Freiman et al. |
| 11,538,161 B2 | 12/2022 | Wang et al. |
| 11,540,931 B2 | 1/2023 | Grady et al. |
| 11,557,036 B2 | 1/2023 | Liao et al. |
| 11,557,069 B2 | 1/2023 | Senzig et al. |
| 11,559,274 B2 | 1/2023 | Auvray et al. |
| 11,564,746 B2 | 1/2023 | Spilker et al. |
| 11,564,748 B2 | 1/2023 | Thienphrapa et al. |
| 11,574,406 B2 | 2/2023 | Chen et al. |
| 11,576,621 B2 | 2/2023 | Sharma et al. |
| 11,576,626 B2 | 2/2023 | Fonte et al. |
| 11,576,637 B2 | 2/2023 | Schmitt et al. |
| 11,576,639 B2 | 2/2023 | Song et al. |
| 11,583,340 B2 | 2/2023 | Taylor |
| 11,589,924 B2 | 2/2023 | Passerini et al. |
| 11,599,996 B2 | 3/2023 | Isgum et al. |
| 11,607,189 B2 | 3/2023 | Tu et al. |
| 11,610,309 B2 | 3/2023 | Kweon et al. |
| 11,610,318 B2 | 3/2023 | Grady et al. |
| 11,615,529 B2 | 3/2023 | Chitiboi et al. |
| 11,615,894 B2 | 3/2023 | Lavi et al. |
| 11,617,620 B2 | 4/2023 | Tran et al. |
| 11,633,118 B2 | 4/2023 | Freiman et al. |

(56) References Cited

U.S. PATENT DOCUMENTS

| | | |
|---|---|---|
| 11,638,609 B2 | 5/2023 | Sankaran et al. |
| 11,642,171 B2 | 5/2023 | Jaquet et al. |
| 11,653,833 B2 | 5/2023 | Sanders et al. |
| 11,664,128 B2 | 5/2023 | Haase et al. |
| 11,666,236 B2 | 6/2023 | Lavi et al. |
| 11,672,434 B2 | 6/2023 | Tochterman et al. |
| 11,678,853 B2 | 6/2023 | Gulsun et al. |
| 11,678,937 B2 | 6/2023 | Choi et al. |
| 11,688,502 B2 | 6/2023 | Anderson et al. |
| 11,690,518 B2 | 7/2023 | Haase et al. |
| 11,694,339 B2 | 7/2023 | Schormans et al. |
| 11,707,196 B2 | 7/2023 | Lavi et al. |
| 11,707,242 B2 | 7/2023 | Van Walsum et al. |
| 11,710,569 B2 | 7/2023 | Grass et al. |
| 11,728,037 B2 | 8/2023 | Lavi et al. |
| 11,741,574 B2 | 8/2023 | Kweon et al. |
| 11,741,602 B2 | 8/2023 | Reiber et al. |
| 11,744,472 B2 | 9/2023 | Zhao et al. |
| 11,744,544 B2 | 9/2023 | Sheehan et al. |
| 11,748,902 B2 | 9/2023 | Bai et al. |
| 11,756,195 B2 | 9/2023 | Kweon et al. |
| 11,769,254 B2 | 9/2023 | Song et al. |
| 11,776,149 B2 | 10/2023 | Wang et al. |
| 11,779,225 B2 | 10/2023 | Adiyoso |
| 11,779,233 B2 | 10/2023 | Huo et al. |
| 11,779,294 B2 | 10/2023 | Liu et al. |
| 11,786,202 B2 | 10/2023 | Yin et al. |
| 11,793,575 B2 | 10/2023 | Taylor |
| 11,803,966 B2 | 10/2023 | Denzinger et al. |
| 11,810,290 B2 | 11/2023 | Flohr et al. |
| 11,810,661 B2 | 11/2023 | Barley et al. |
| 11,816,836 B2 | 11/2023 | Isgum et al. |
| 11,816,837 B2 | 11/2023 | Lavi et al. |
| 11,826,106 B2 | 11/2023 | Hart et al. |
| 11,826,175 B2 | 11/2023 | Itu et al. |
| 11,847,547 B2 | 12/2023 | Wang et al. |
| 11,861,825 B2 | 1/2024 | Van Pelt et al. |
| 11,861,839 B2 | 1/2024 | Weese et al. |
| 11,861,851 B2 | 1/2024 | Figueroa-Alvarez et al. |
| 11,869,142 B2 | 1/2024 | Bai et al. |
| 11,883,225 B2 | 1/2024 | Sankaran et al. |
| 11,896,416 B2 | 2/2024 | Huo et al. |
| 11,901,081 B2 | 2/2024 | Huo et al. |
| 11,918,291 B2 | 3/2024 | Grass et al. |
| 11,931,195 B2 | 3/2024 | Itu et al. |
| 11,937,963 B2 | 3/2024 | Lavi et al. |
| 11,944,387 B2 | 4/2024 | Sankaran et al. |
| 11,948,677 B2 | 4/2024 | Ghose et al. |
| 11,948,695 B2 | 4/2024 | Taylor et al. |
| 11,980,492 B2 | 5/2024 | Venugopal et al. |
| 11,983,473 B2 | 5/2024 | Aben et al. |
| 11,986,280 B2 | 5/2024 | Grady et al. |
| 11,995,834 B2 | 5/2024 | Neumann et al. |
| 12,016,635 B2 | 6/2024 | Taylor |
| 12,023,189 B2 | 7/2024 | Haase et al. |
| 12,027,253 B2 | 7/2024 | Schoebinger et al. |
| 12,029,494 B2 | 7/2024 | Taylor |
| 12,039,729 B2 | 7/2024 | Kweon et al. |
| 12,048,575 B2 | 7/2024 | Vaillant et al. |
| 12,051,192 B2 | 7/2024 | Aben et al. |
| 12,051,202 B2 | 7/2024 | Freiman et al. |
| 12,051,497 B2 | 7/2024 | Grady et al. |
| 12,062,198 B2 | 8/2024 | Liu et al. |
| 12,067,729 B2 | 8/2024 | Thamm et al. |
| 12,079,994 B2 | 9/2024 | Lavi et al. |
| 12,089,977 B2 | 9/2024 | Isgum et al. |
| 12,094,112 B2 | 9/2024 | Gulsun et al. |
| 12,094,188 B2 | 9/2024 | Li et al. |
| 12,094,596 B2 | 9/2024 | Wang et al. |
| 12,100,174 B2 | 9/2024 | Vaillant et al. |
| 12,100,502 B2 | 9/2024 | Cimen et al. |
| 12,109,061 B2 | 10/2024 | Itu et al. |
| 12,109,065 B2 | 10/2024 | Sheehan et al. |
| 12,112,471 B2 | 10/2024 | Viti et al. |
| 12,112,483 B2 | 10/2024 | Grady et al. |
| 12,115,014 B2 | 10/2024 | Haase et al. |
| 12,118,724 B2 | 10/2024 | Van Pelt et al. |
| 12,119,117 B2 | 10/2024 | Wang et al. |
| 12,125,217 B2 | 10/2024 | Venugopal et al. |
| 12,125,261 B2 | 10/2024 | Petersen et al. |
| 12,131,525 B2 | 10/2024 | Groth et al. |
| 12,136,209 B2 | 11/2024 | Haase et al. |
| 12,138,026 B2 | 11/2024 | Grady et al. |
| 12,138,027 B2 | 11/2024 | Lavi et al. |
| 12,142,384 B2 | 11/2024 | Rabbat et al. |
| 12,175,631 B2 | 12/2024 | Kweon et al. |
| 12,175,669 B2 | 12/2024 | Wang et al. |
| 12,176,094 B2 | 12/2024 | Taylor et al. |
| 12,178,557 B2 | 12/2024 | Grady et al. |
| 2003/0105401 A1 | 6/2003 | Jago et al. |
| 2004/0019264 A1 | 1/2004 | Suurmond et al. |
| 2004/0066958 A1 | 4/2004 | Chen et al. |
| 2005/0041842 A1 | 2/2005 | Frakes et al. |
| 2005/0043614 A1 | 2/2005 | Huizenga et al. |
| 2005/0249327 A1 | 11/2005 | Wink et al. |
| 2005/0272992 A1 | 12/2005 | O'Donnell et al. |
| 2006/0036167 A1 | 2/2006 | Shina |
| 2006/0074285 A1* | 4/2006 | Zarkh ............... G06T 7/33 600/407 |
| 2006/0084862 A1 | 4/2006 | Suurmond et al. |
| 2007/0031019 A1 | 2/2007 | Lesage et al. |
| 2007/0167833 A1 | 7/2007 | Redel et al. |
| 2008/0020362 A1 | 1/2008 | Cotin et al. |
| 2008/0187199 A1 | 8/2008 | Gulsun et al. |
| 2008/0205722 A1 | 8/2008 | Schaefer et al. |
| 2009/0016483 A1 | 1/2009 | Kawasaki et al. |
| 2009/0016587 A1 | 1/2009 | Strobel et al. |
| 2009/0171321 A1 | 7/2009 | Callaghan |
| 2009/0299640 A1* | 12/2009 | Ellis ............... C12Q 1/6886 702/19 |
| 2009/0312648 A1 | 12/2009 | Zhang et al. |
| 2010/0010428 A1 | 1/2010 | Yu et al. |
| 2010/0017171 A1 | 1/2010 | Spilker et al. |
| 2010/0021025 A1 | 1/2010 | Hof et al. |
| 2010/0067760 A1 | 3/2010 | Zhang et al. |
| 2010/0125197 A1 | 5/2010 | Fishel |
| 2010/0160764 A1 | 6/2010 | Steinberg et al. |
| 2010/0160773 A1 | 6/2010 | Cohen et al. |
| 2010/0161023 A1* | 6/2010 | Cohen ............... G06T 7/13 623/2.11 |
| 2010/0220917 A1 | 9/2010 | Steinberg et al. |
| 2010/0296709 A1 | 11/2010 | Ostrovsky-Berman et al. |
| 2010/0298719 A1 | 11/2010 | Thrysoe et al. |
| 2011/0015530 A1 | 1/2011 | Misawa |
| 2011/0091377 A1* | 4/2011 | Alani ............... C12Q 1/6886 424/1.49 |
| 2011/0096907 A1 | 4/2011 | Mohamed |
| 2011/0134433 A1 | 6/2011 | Yamada |
| 2011/0135175 A1 | 6/2011 | Ostrovsky-Berman et al. |
| 2011/0142313 A1 | 6/2011 | Pack et al. |
| 2011/0182492 A1 | 7/2011 | Grass et al. |
| 2012/0014574 A1 | 1/2012 | Ferschel et al. |
| 2012/0041318 A1 | 2/2012 | Taylor |
| 2012/0041739 A1 | 2/2012 | Taylor |
| 2012/0053918 A1 | 3/2012 | Taylor |
| 2012/0053919 A1 | 3/2012 | Taylor |
| 2012/0053921 A1 | 3/2012 | Taylor |
| 2012/0059246 A1 | 3/2012 | Taylor |
| 2012/0059249 A1 | 3/2012 | Verard et al. |
| 2012/0062841 A1 | 3/2012 | Stetson et al. |
| 2012/0072190 A1 | 3/2012 | Sharma et al. |
| 2012/0075284 A1 | 3/2012 | Rivers et al. |
| 2012/0150048 A1 | 6/2012 | Kang et al. |
| 2012/0177275 A1 | 7/2012 | Suri |
| 2012/0230565 A1 | 9/2012 | Steinberg et al. |
| 2012/0236032 A1 | 9/2012 | Arvidsson |
| 2012/0243761 A1 | 9/2012 | Senzig et al. |
| 2013/0028490 A1* | 1/2013 | Kim ............... G06T 5/50 382/128 |
| 2013/0054214 A1 | 2/2013 | Taylor |
| 2013/0060133 A1 | 3/2013 | Kassab et al. |
| 2013/0094745 A1 | 4/2013 | Sundar |
| 2013/0158476 A1 | 6/2013 | Olson |
| 2013/0182936 A1 | 7/2013 | Yoshihara et al. |

(56) References Cited

U.S. PATENT DOCUMENTS

| | | |
|---|---|---|
| 2013/0226003 A1 | 8/2013 | Edic et al. |
| 2013/0229621 A1 | 9/2013 | Stetson et al. |
| 2013/0324842 A1 | 12/2013 | Mittal et al. |
| 2014/0005535 A1 | 1/2014 | Edic et al. |
| 2014/0046642 A1 | 2/2014 | Hart et al. |
| 2014/0086461 A1 | 3/2014 | Yao et al. |
| 2014/0094693 A1 | 4/2014 | Cohen et al. |
| 2014/0094697 A1 | 4/2014 | Petroff et al. |
| 2014/0100451 A1 | 4/2014 | Tolkowsky et al. |
| 2014/0121513 A1 | 5/2014 | Tolkowsky et al. |
| 2014/0142398 A1 | 5/2014 | Patil et al. |
| 2014/0200867 A1 | 7/2014 | Lavi et al. |
| 2014/0249790 A1 | 9/2014 | Spilker et al. |
| 2014/0303495 A1 | 10/2014 | Fonte et al. |
| 2014/0371578 A1 | 12/2014 | Auvray et al. |
| 2015/0201897 A1 | 7/2015 | Kyriakou |
| 2015/0213600 A1 | 7/2015 | Kyriakou |
| 2015/0250395 A1 | 9/2015 | Igarashi |
| 2015/0265162 A1 | 9/2015 | Lavi et al. |
| 2015/0265222 A1 | 9/2015 | Sakaguchi |
| 2015/0297373 A1 | 10/2015 | Schmitt et al. |
| 2015/0302578 A1 | 10/2015 | Grady et al. |
| 2015/0335304 A1* | 11/2015 | Lavi .................. G06T 7/00 600/407 |
| 2015/0339847 A1* | 11/2015 | Benishti .............. A61B 5/026 382/131 |
| 2015/0342551 A1 | 12/2015 | Lavi et al. |
| 2016/0007945 A1 | 1/2016 | Taylor |
| 2016/0015349 A1 | 1/2016 | Ohuchi et al. |
| 2016/0022371 A1 | 1/2016 | Sauer et al. |
| 2016/0035088 A1 | 2/2016 | Abramoff et al. |
| 2016/0073928 A1 | 3/2016 | Soper et al. |
| 2016/0110866 A1 | 4/2016 | Taylor |
| 2016/0110867 A1 | 4/2016 | Taylor |
| 2016/0128661 A1 | 5/2016 | Taylor |
| 2016/0157802 A1 | 6/2016 | Anderson |
| 2016/0228000 A1 | 8/2016 | Spaide |
| 2016/0247279 A1 | 8/2016 | Lavi et al. |
| 2016/0371456 A1 | 12/2016 | Taylor et al. |
| 2017/0018116 A1 | 1/2017 | Sun et al. |
| 2017/0039736 A1* | 2/2017 | Aben .................. G06T 17/10 |
| 2017/0161897 A1* | 6/2017 | Hoffmann ........... A61B 6/5235 |
| 2017/0224418 A1 | 8/2017 | Boettner et al. |
| 2017/0258433 A1* | 9/2017 | Gulsun ............... A61B 6/5217 |
| 2017/0286628 A1 | 10/2017 | Shim |
| 2017/0325770 A1 | 11/2017 | Edic et al. |
| 2018/0032653 A1 | 2/2018 | Aben et al. |
| 2018/0033192 A1* | 2/2018 | de Vaan ............. G06T 15/506 |
| 2018/0075221 A1 | 3/2018 | Vergaro et al. |
| 2018/0089829 A1 | 3/2018 | Zhong et al. |
| 2018/0102189 A1 | 4/2018 | Hosoi et al. |
| 2018/0182096 A1 | 6/2018 | Grady et al. |
| 2018/0211386 A1* | 7/2018 | Ma .................... G06T 7/0016 |
| 2018/0235561 A1 | 8/2018 | Lavi et al. |
| 2018/0243033 A1 | 8/2018 | Tran et al. |
| 2018/0268941 A1 | 9/2018 | Lavi et al. |
| 2018/0271614 A1 | 9/2018 | Kunio |
| 2018/0280088 A1 | 10/2018 | Davies |
| 2018/0315193 A1* | 11/2018 | Paschalakis ............ A61B 3/12 |
| 2018/0330507 A1 | 11/2018 | Schormans et al. |
| 2018/0344173 A1 | 12/2018 | Tu et al. |
| 2018/0344174 A9 | 12/2018 | Schmitt et al. |
| 2019/0005737 A1 | 1/2019 | Auvray et al. |
| 2019/0019347 A1 | 1/2019 | Auvray et al. |
| 2019/0130578 A1 | 5/2019 | Gulsun et al. |
| 2019/0156159 A1* | 5/2019 | Kopparapu ....... G06F 18/24147 |
| 2019/0180880 A1 | 6/2019 | Lavi et al. |
| 2019/0282199 A1 | 9/2019 | Merritt |
| 2019/0362494 A1* | 11/2019 | Wang .................... G06N 7/01 |
| 2019/0380593 A1 | 12/2019 | Bouwman et al. |
| 2020/0126229 A1 | 4/2020 | Lavi et al. |
| 2020/0138521 A1 | 5/2020 | Aben et al. |
| 2020/0143526 A1* | 5/2020 | Wang ..................... G06T 5/50 |
| 2020/0160509 A1* | 5/2020 | Pack ................... G16H 30/40 |
| 2020/0222018 A1 | 7/2020 | van Walsum et al. |
| 2020/0226422 A1* | 7/2020 | Li ........................ G06F 18/40 |
| 2020/0265958 A1 | 8/2020 | Haase et al. |
| 2020/0337664 A1 | 10/2020 | Homann et al. |
| 2020/0349708 A1 | 11/2020 | Igarashi et al. |
| 2020/0394795 A1 | 12/2020 | Isgum et al. |
| 2021/0022617 A1 | 1/2021 | Zhao et al. |
| 2021/0035290 A1 | 2/2021 | Aben et al. |
| 2021/0085397 A1 | 3/2021 | Passerini et al. |
| 2021/0209757 A1* | 7/2021 | Min .................... A61B 6/5217 |
| 2021/0244293 A1 | 8/2021 | Belleville |
| 2021/0244475 A1 | 8/2021 | Taylor |
| 2021/0259559 A1 | 8/2021 | Tu et al. |
| 2021/0267690 A1 | 9/2021 | Taylor |
| 2021/0272030 A1 | 9/2021 | Sankaran et al. |
| 2021/0275124 A1 | 9/2021 | Huo et al. |
| 2021/0280318 A1 | 9/2021 | Huo et al. |
| 2021/0282731 A1 | 9/2021 | Vaillant et al. |
| 2021/0282860 A1 | 9/2021 | Taylor |
| 2021/0290308 A1 | 9/2021 | Mihalef et al. |
| 2021/0298706 A1 | 9/2021 | Tu et al. |
| 2021/0298708 A1 | 9/2021 | Aben et al. |
| 2021/0334963 A1 | 10/2021 | Isgum et al. |
| 2021/0338088 A1 | 11/2021 | Bouwman et al. |
| 2021/0345889 A1 | 11/2021 | Tu et al. |
| 2021/0358634 A1 | 11/2021 | Sankaran et al. |
| 2021/0361176 A1 | 11/2021 | Huo et al. |
| 2021/0374950 A1 | 12/2021 | Gao et al. |
| 2021/0383539 A1 | 12/2021 | Haase et al. |
| 2021/0401400 A1 | 12/2021 | Sheehan et al. |
| 2022/0012876 A1 | 1/2022 | Sommer et al. |
| 2022/0012878 A1 | 1/2022 | Aoyama |
| 2022/0015730 A1 | 1/2022 | Haase et al. |
| 2022/0028080 A1 | 1/2022 | Lavi et al. |
| 2022/0036646 A1 | 2/2022 | Song et al. |
| 2022/0039769 A1 | 2/2022 | M et al. |
| 2022/0047236 A1 | 2/2022 | Lavi et al. |
| 2022/0054022 A1 | 2/2022 | Van Lavieren et al. |
| 2022/0079455 A1 | 3/2022 | Haase et al. |
| 2022/0079540 A1 | 3/2022 | Sankaran et al. |
| 2022/0079563 A1 | 3/2022 | Kemp |
| 2022/0087544 A1 | 3/2022 | Schmitt et al. |
| 2022/0092775 A1 | 3/2022 | Denzinger et al. |
| 2022/0092784 A1 | 3/2022 | Tu et al. |
| 2022/0101535 A1 | 3/2022 | Thamm et al. |
| 2022/0110687 A1 | 4/2022 | Spilker et al. |
| 2022/0125398 A1 | 4/2022 | Aben |
| 2022/0151580 A1 | 5/2022 | Itu et al. |
| 2022/0156918 A1 | 5/2022 | Chitiboi et al. |
| 2022/0164950 A1 | 5/2022 | Aben et al. |
| 2022/0164953 A1 | 5/2022 | Gulsun et al. |
| 2022/0167938 A1 | 6/2022 | Grass et al. |
| 2022/0172368 A1 | 6/2022 | Lavi et al. |
| 2022/0183655 A1 | 6/2022 | Huang et al. |
| 2022/0211280 A1 | 7/2022 | Lavi et al. |
| 2022/0211439 A1 | 7/2022 | Sankaran et al. |
| 2022/0215534 A1 | 7/2022 | Bai et al. |
| 2022/0230312 A1 | 7/2022 | Choi et al. |
| 2022/0233081 A1 | 7/2022 | Cheline et al. |
| 2022/0254028 A1 | 8/2022 | Liu et al. |
| 2022/0254131 A1 | 8/2022 | Lavi et al. |
| 2022/0261997 A1 | 8/2022 | Liu et al. |
| 2022/0262000 A1 | 8/2022 | Haase et al. |
| 2022/0273180 A1 | 9/2022 | Lavi et al. |
| 2022/0277447 A1 | 9/2022 | Wang et al. |
| 2022/0287668 A1 | 9/2022 | Gulsun et al. |
| 2022/0301156 A1 | 9/2022 | Fang et al. |
| 2022/0310265 A1 | 9/2022 | Benishti et al. |
| 2022/0319004 A1 | 10/2022 | Bruch-el et al. |
| 2022/0319116 A1 | 10/2022 | Wang et al. |
| 2022/0335612 A1 | 10/2022 | Bruch-El et al. |
| 2022/0344033 A1 | 10/2022 | Wang et al. |
| 2022/0351369 A1 | 11/2022 | Haase et al. |
| 2022/0359063 A1 | 11/2022 | Tombropoulos et al. |
| 2022/0378383 A1 | 12/2022 | Chen et al. |
| 2022/0392616 A1 | 12/2022 | Ghose et al. |
| 2022/0415510 A1 | 12/2022 | Wang et al. |
| 2023/0005113 A1 | 1/2023 | Li et al. |
| 2023/0028300 A1 | 1/2023 | Lichy et al. |
| 2023/0037338 A1 | 2/2023 | Wang et al. |

(56) References Cited

U.S. PATENT DOCUMENTS

| | | |
|---|---|---|
| 2023/0038364 A1 | 2/2023 | Bhowmick et al. |
| 2023/0052595 A1 | 2/2023 | Langoju et al. |
| 2023/0071558 A1 | 3/2023 | Vaidya et al. |
| 2023/0084748 A1 | 3/2023 | Lavi et al. |
| 2023/0086196 A1 | 3/2023 | Chitiboi et al. |
| 2023/0095242 A1 | 3/2023 | Liu et al. |
| 2023/0097133 A1 | 3/2023 | Bai et al. |
| 2023/0097267 A1 | 3/2023 | Schwemmer et al. |
| 2023/0102646 A1 | 3/2023 | Birkhold et al. |
| 2023/0108647 A1 | 4/2023 | Tu et al. |
| 2023/0113721 A1 | 4/2023 | Kassel et al. |
| 2023/0117179 A1* | 4/2023 | Jule .................. C12N 5/0671 382/129 |
| 2023/0142152 A1 | 5/2023 | Venugopal et al. |
| 2023/0142219 A1 | 5/2023 | Makino |
| 2023/0144624 A1 | 5/2023 | Venugopal et al. |
| 2023/0144795 A1 | 5/2023 | Wang et al. |
| 2023/0148977 A1 | 5/2023 | Fonte et al. |
| 2023/0177677 A1* | 6/2023 | Yuan .................. G06T 7/0012 382/128 |
| 2023/0186472 A1 | 6/2023 | Kweon et al. |
| 2023/0196582 A1 | 6/2023 | Grady et al. |
| 2023/0197286 A1 | 6/2023 | Grady et al. |
| 2023/0230235 A1 | 7/2023 | Isgum et al. |
| 2023/0237648 A1 | 7/2023 | Gulsun et al. |
| 2023/0237652 A1 | 7/2023 | Flexman et al. |
| 2023/0245301 A1 | 8/2023 | Wang et al. |
| 2023/0252628 A1 | 8/2023 | Haase et al. |
| 2023/0252632 A1 | 8/2023 | Shalhon Livne et al. |
| 2023/0260107 A1* | 8/2023 | Dhatt .................. A61B 8/464 382/131 |
| 2023/0263401 A1 | 8/2023 | Escaned-Barbosa et al. |
| 2023/0277247 A1 | 9/2023 | Taylor et al. |
| 2023/0282365 A1 | 9/2023 | Lavi et al. |
| 2023/0298176 A1 | 9/2023 | Choi et al. |
| 2023/0298180 A1 | 9/2023 | Kweon et al. |
| 2023/0307144 A1 | 9/2023 | He et al. |
| 2023/0309943 A1 | 10/2023 | van Walsum et al. |
| 2023/0320789 A1 | 10/2023 | Bai et al. |
| 2023/0326127 A1 | 10/2023 | Zhong et al. |
| 2023/0334659 A1 | 10/2023 | Kuo et al. |
| 2023/0346236 A1 | 11/2023 | Lavi et al. |
| 2023/0352152 A1 | 11/2023 | Grady et al. |
| 2023/0355107 A1 | 11/2023 | Haase et al. |
| 2023/0355196 A1 | 11/2023 | Kang et al. |
| 2023/0355197 A1 | 11/2023 | Florent et al. |
| 2023/0360803 A1 | 11/2023 | Sankaran et al. |
| 2023/0368378 A1 | 11/2023 | Kim et al. |
| 2023/0386037 A1 | 11/2023 | Denzinger et al. |
| 2023/0394654 A1 | 12/2023 | Hampe et al. |
| 2023/0404525 A1 | 12/2023 | Sheehan et al. |
| 2023/0410307 A1 | 12/2023 | Nickisch et al. |
| 2024/0029529 A1 | 1/2024 | Scalisi |
| 2024/0029868 A1 | 1/2024 | Gulsun et al. |
| 2024/0046465 A1 | 2/2024 | Sharma et al. |
| 2024/0047043 A1 | 2/2024 | Flexman et al. |
| 2024/0050159 A1 | 2/2024 | Hart et al. |
| 2024/0065772 A1 | 2/2024 | Levi et al. |
| 2024/0078676 A1 | 3/2024 | Van Pelt et al. |
| 2024/0096479 A1 | 3/2024 | Kraus et al. |
| 2024/0099589 A1 | 3/2024 | Lavi et al. |
| 2024/0099683 A1 | 3/2024 | Cimen et al. |
| 2024/0104719 A1 | 3/2024 | Gulsun et al. |
| 2024/0126958 A1 | 4/2024 | Aben et al. |
| 2024/0130674 A1 | 4/2024 | Sonck et al. |
| 2024/0130796 A1 | 4/2024 | Song et al. |
| 2024/0153087 A1 | 5/2024 | Lavi et al. |
| 2024/0164865 A1 | 5/2024 | Kottenstette et al. |
| 2024/0169540 A1 | 5/2024 | Bouwman et al. |
| 2024/0185485 A1 | 6/2024 | Salomon et al. |
| 2024/0185509 A1 | 6/2024 | Kovler et al. |
| 2024/0206838 A1 | 6/2024 | Lavi et al. |
| 2024/0212159 A1 | 6/2024 | Katzmann et al. |
| 2024/0215937 A1 | 7/2024 | Itu et al. |
| 2024/0221355 A1 | 7/2024 | Kweon et al. |
| 2024/0260919 A1 | 8/2024 | Venugopal et al. |
| 2024/0273723 A1 | 8/2024 | Tison et al. |
| 2024/0315777 A1 | 9/2024 | Choi et al. |
| 2024/0374148 A1 | 11/2024 | Haase et al. |
| 2024/0386652 A1 | 11/2024 | Grady et al. |
| 2024/0394875 A1 | 11/2024 | Van Der Horst et al. |
| 2024/0394996 A1 | 11/2024 | Hitschrich et al. |
| 2024/0404031 A1 | 12/2024 | Auvray et al. |
| 2024/0404057 A1 | 12/2024 | Florent et al. |
| 2024/0407656 A1 | 12/2024 | This et al. |
| 2024/0412365 A1 | 12/2024 | Kim |
| 2024/0420331 A1 | 12/2024 | Kim et al. |
| 2024/0423575 A1 | 12/2024 | Itu et al. |
| 2024/0428477 A1 | 12/2024 | Salehi et al. |

FOREIGN PATENT DOCUMENTS

| | | |
|---|---|---|
| CN | 113935976 | 1/2022 |
| EP | 1396274 | 3/2004 |
| EP | 2163272 | 3/2010 |
| EP | 2633815 A1 | 9/2013 |
| EP | 2779907 | 9/2014 |
| EP | 2873371 | 5/2015 |
| EP | 3125764 | 2/2017 |
| EP | 2633815 B1 | 6/2017 |
| EP | 2977922 | 3/2019 |
| EP | 3477551 | 5/2019 |
| EP | 3763285 | 1/2021 |
| EP | 2776960 | 9/2021 |
| EP | 3534372 | 9/2021 |
| EP | 3884868 | 9/2021 |
| EP | 3282380 | 11/2021 |
| EP | 3282381 | 11/2021 |
| EP | 3903672 | 11/2021 |
| EP | 3912139 | 11/2021 |
| EP | 3664026 | 2/2022 |
| EP | 3945469 | 2/2022 |
| EP | 3949860 | 2/2022 |
| EP | 3951705 | 2/2022 |
| EP | 3076854 | 4/2022 |
| EP | 3979259 | 4/2022 |
| EP | 3982324 | 4/2022 |
| EP | 3258446 | 5/2022 |
| EP | 4002288 | 5/2022 |
| EP | 4026143 | 7/2022 |
| EP | 4026491 | 7/2022 |
| EP | 4026492 | 7/2022 |
| EP | 4029438 | 7/2022 |
| EP | 3298959 | 9/2022 |
| EP | 3989828 | 11/2022 |
| EP | 3157411 | 12/2022 |
| EP | 3606437 | 12/2022 |
| EP | 4104765 | 12/2022 |
| EP | 4113434 | 1/2023 |
| EP | 4131150 | 2/2023 |
| EP | 4137053 | 2/2023 |
| EP | 4145391 | 3/2023 |
| EP | 4156112 | 3/2023 |
| EP | 3169237 | 4/2023 |
| EP | 4160528 | 4/2023 |
| EP | 4160543 | 4/2023 |
| EP | 4170579 | 4/2023 |
| EP | 4186417 | 5/2023 |
| EP | 3403582 | 6/2023 |
| EP | 3743883 | 6/2023 |
| EP | 3989832 | 8/2023 |
| EP | 4220553 | 8/2023 |
| EP | 4224416 | 8/2023 |
| EP | 3652747 | 9/2023 |
| EP | 4104766 | 9/2023 |
| EP | 4238500 | 9/2023 |
| EP | 3602485 | 10/2023 |
| EP | 4064181 | 11/2023 |
| EP | 3602487 | 12/2023 |
| EP | 4300419 | 1/2024 |
| EP | 4312184 | 1/2024 |
| EP | 3404667 | 2/2024 |
| EP | 3878366 | 4/2024 |
| EP | 3457413 | 5/2024 |

(56) References Cited

FOREIGN PATENT DOCUMENTS

| | | |
|---|---|---|
| EP | 4005472 | 5/2024 |
| EP | 4369290 | 5/2024 |
| EP | 4176814 | 7/2024 |
| EP | 4413927 | 8/2024 |
| EP | 4418206 | 8/2024 |
| EP | 3846176 | 9/2024 |
| EP | 3881758 | 9/2024 |
| EP | 3564963 | 10/2024 |
| EP | 4056110 | 10/2024 |
| JP | H08-131429 | 5/1996 |
| JP | 2003-508152 | 3/2003 |
| JP | 2003-514600 | 4/2003 |
| JP | 2004-243117 | 9/2004 |
| JP | 2007-502644 | 2/2007 |
| JP | 2007-325920 | 12/2007 |
| JP | 4177217 B2 | 11/2008 |
| JP | 2010-042247 | 2/2010 |
| JP | 2011-212314 | 10/2011 |
| JP | 2013-090799 | 5/2013 |
| JP | 2010-505493 | 7/2013 |
| JP | 2013-534154 | 9/2013 |
| JP | 2014-064915 | 4/2014 |
| JP | 2014-128631 | 7/2014 |
| JP | 2015-527901 | 9/2015 |
| JP | 2017-516535 | 6/2017 |
| JP | 2018-057835 | 4/2018 |
| JP | 2018-089364 | 6/2018 |
| NL | 2012324 | 8/2015 |
| WO | WO 2001/21057 | 3/2001 |
| WO | WO 2007/066249 | 6/2007 |
| WO | WO 2010/033971 | 3/2010 |
| WO | WO 2011/038044 | 3/2011 |
| WO | WO 2011/039685 | 4/2011 |
| WO | WO 2012/021037 | 2/2012 |
| WO | WO 2012/021307 | 2/2012 |
| WO | WO 2012/043498 | 4/2012 |
| WO | WO 2012/173697 | 12/2012 |
| WO | WO 2013/102880 | 7/2013 |
| WO | WO 2014/027692 | 2/2014 |
| WO | WO 2014/064702 | 5/2014 |
| WO | WO 2014/111927 | 7/2014 |
| WO | WO 2014/111929 | 7/2014 |
| WO | WO 2014/111930 | 7/2014 |
| WO | WO 2015/017420 | 2/2015 |
| WO | WO 2015/059706 | 4/2015 |
| WO | WO 2016/161356 | 10/2016 |
| WO | WO 2017/056007 | 4/2017 |
| WO | WO 2017/199245 | 11/2017 |
| WO | WO 2017/199246 | 11/2017 |
| WO | WO 2017/200381 | 11/2017 |
| WO | WO 2018/165478 | 9/2018 |
| WO | WO 2018/178272 | 10/2018 |
| WO | WO 2019/101630 | 5/2019 |
| WO | WO 2020/053099 | 3/2020 |
| WO | WO 2020/084101 | 4/2020 |
| WO | WO 2020/201942 | 10/2020 |
| WO | WO 2021/016071 | 1/2021 |
| WO | WO 2021/059165 | 4/2021 |
| WO | WO 2021/175039 | 9/2021 |
| WO | WO 2021/191909 | 9/2021 |
| WO | WO 2021/258835 | 12/2021 |
| WO | WO 2022/000727 | 1/2022 |
| WO | WO 2022/000729 | 1/2022 |
| WO | WO 2022/000733 | 1/2022 |
| WO | WO 2022/000734 | 1/2022 |
| WO | WO 2022/000976 | 1/2022 |
| WO | WO 2022/000977 | 1/2022 |
| WO | WO 2022/002765 | 1/2022 |
| WO | WO 2022/019765 | 1/2022 |
| WO | WO 2022/069208 | 4/2022 |
| WO | WO 2022/086326 | 4/2022 |
| WO | WO 2022/109902 | 6/2022 |
| WO | WO 2022/109903 | 6/2022 |
| WO | WO 2022/109904 | 6/2022 |
| WO | WO 2022/109907 | 6/2022 |
| WO | WO 2022/136043 | 6/2022 |
| WO | WO 2022/161239 | 8/2022 |
| WO | WO 2022/167940 | 8/2022 |
| WO | WO 2022/184736 | 9/2022 |
| WO | WO 2022/199238 | 9/2022 |
| WO | WO 2022/235162 | 11/2022 |
| WO | WO 2022/261641 | 12/2022 |
| WO | WO 2023/277283 | 1/2023 |
| WO | WO 2023/057296 | 4/2023 |
| WO | WO 2023/099144 | 6/2023 |
| WO | WO 2023/104538 | 6/2023 |
| WO | WO 2023/115576 | 6/2023 |
| WO | WO 2023/146401 | 8/2023 |
| WO | WO 2023/152688 | 8/2023 |
| WO | WO 2023/191380 | 10/2023 |
| WO | WO 2023/224369 | 11/2023 |
| WO | WO 2022/228464 | 12/2023 |
| WO | WO 2024/022809 | 2/2024 |
| WO | WO 2024/023048 | 2/2024 |
| WO | WO 2024/034748 | 2/2024 |
| WO | WO 2024/074309 | 4/2024 |
| WO | WO 2024/083538 | 4/2024 |
| WO | WO 2024/121060 | 6/2024 |
| WO | WO 2024/151926 | 7/2024 |
| WO | WO 2024/156859 | 8/2024 |
| WO | WO 2024/160583 | 8/2024 |
| WO | WO 2024/177428 | 8/2024 |

OTHER PUBLICATIONS

Andriotis et al., "A new method of three-dimensional coronary artery reconstruction from X-Ray angiography: Validation against a virtual phantom and multislice computed tomography" Catheterization and Cardiovascular Interventions, vol. 71:28-43 (2008).

Barnea, "Model-based estimation of coronary vessel diameter in angiographic images", Proceedings of the 20th Annual International Conference of the IEEE Engineering in Medicine and Biology Society, vol. 20:513-516 (1998).

Barratt et al., "Reconstruction and quantification of the carotid artery bifurcation from 3-D ultrasound images", IEEE Transactions on Medical Imaging, vol. 23(5):567-583 (2004).

Bullitt et al., "Determining malignancy of brain tumors by analysis of vessel shape", Medical Image Computing and Computer-Assisted Intervention, MICCAI 2004 Conference Proceedings, Lecture notes in Computer Science, LNCS, 3217:645-653.

Caiati et al., "New noninvasive method for coronary flow reserve assessment: Contrast-enhanced transthoracic second harmonic echo doppler", Circulation, vol. 99:771-778 (1999).

Caiati et al., "Detection, location, and severity assessment of left anterior descneding coronary artery stenoses by means of contrast-enhanced transthoracic harmonic echo dopper", European Heart Journal, vol. 30:1797-1806 (2009).

Chung, "Image segmentation methods for detecting blood vessels in angiography", 2006 9th International Conference on Control, Automation, Robotics and Vision, Singapore, pp. 1-6 (2006).

Dickie et al., "Live-vessel: interactive vascular image segmentation with simultaneous extraction of optimal medial and boundary paths", Technical Report TR 2009-23, School of Computing Science, Simon Fraser University, Burnaby, BC, Canada, Nov. 2009.

Frangi et al., "Multiscale vessel and enhancement filtering", Medical Image Computing and Computer-Assisted Intervention, MICCA '98 Lecture Notes in Computer Science, vol. 1496:130-137 (1998).

Fraz, "Blood vessel segmentation methodologies, in retinal images—a survey", Computer Methods and Programs in Biomedicine, vol. 108:407-433 (2012).

Fusejima, "Noninvasive measurement of coronary artery blood flow using combined two-dimensional and doppler echocardiography", JACC vol. 10(5):1024-1031 (1987).

Hawkes et al., "Validation of volume blood flow measurements using three-dimensional distance-concentration functions detived from digital X-Ray angiograms", Investigative Radiology, vol. 29(4):434-442 (1994).

Hoffmann et al., "Determination of instantaneous and average blood flow rates from digital angiograms of vessel phantoms using distance-density curves", Investigative Radiology, vol. 26(3):207-212 (1991).

(56) References Cited

OTHER PUBLICATIONS

Holdsworth et al., "Quantitative angiographic blood-flow measurement using pulsed intra-arterial injection", Medical Physics, vol. 26(10):2168-2175 (1999).
Huo et al., "Intraspecific scaling laws of vascular trees", J.R. Soc. Interface vol. 9:190-200 (2012).
Janssen et al., "New approaches for the assessment of vessel sizes in quantitative (cardio-)vascular X-ray analysis", Int J Cardiovasc Imaging vol. 26:259-271 (2010).
Jiang et al., "Vascular tree reconstruction by minimizing a physiological functional cost", 2010 IEEE Computer Society Conference on Computer Vision and Pattern Recognition—workshops, San Francisco, CA, pp. 178-185, doi: 10.1109/CVPRW.2010.5543593.
Kappetein et al, "Current percutaneous coronary intervention and coronary artery bypass grafting practices for three-vessel and left main coronary artery disease: Insights from the Syntax run-in phase", European Journal of Cardio-Thoracic Surgery, vol. 29:486-491 (2010).
Kass et al., "Snakes: active contour models", Int. J. Comput. Vis. vol. 1:321-331 (1987).
Kirkeeide, "Coronary obstructions, morphology and physiologic significance", Quantitative Coronary Arteriography, Chap. 11:229-244 (1991).
Lethen et al., "Validation of noninvasive assessment of coronary flow velocity reserve in the right coronary artery—A comparison of transthoracic echocardiographic results with intracoronary doppler flow wire measurements", European Heart Journal, vol. 24:1567-1575 (2003).
Li et al, "Minimization of region-scalable fitting energy for image segmentation", in IEEE Transactions on Image Processing, vol. 17(10):1940-1949 (2008).
Meimoun et al., "Non-invasive assessment of coronary flow and coronary flow reserve by transthoracic doppler echocardiography: a magic tool for the real world", European Journal of Echocardiography, vol. 9:449-457 (2008).
Mercer-Rosa et al., "Illustration of the additional value of real-time 3-dimensional echocardiography to conventional transthoracic and transesophageal 2-dimensional echocardiography in imaging muscular ventricular septal defects: does this have any impact on individual patient treatment", Journal of the American Society of Echocardiography, vol. 19(12):1511-1519 (2006).
Molloi et al., "Quantification of fractional flow reserve using angiographic image data", World Congress on Medical Physics and Biomedical Engineering, Munich, Germany, Sep. 7-12, 2009.
Molloi et al., "Estimation of coronary artery hyperemic blood flow based on arterial lumen volume using angiographic images", Int J Cardiovasc Imaging, vol. 28:1-11 (2012).
Ng et al., "Novel QCA methodologies and angiographic scores", Int J Cardiovasc Imaging vol. 27:157-165 (2011).
Pellot et al, "A 3D reconstruction of vascular structures from two X-Ray angiograms using an adapted simulated annealing algorithm", IEEE Transactions of Medical Imaging, vol. 13(1):48-60 (1994).
Pinho et al., "Assessment and stenting of tracheal stenosis using deformable shape models", Medical Image Analysis, vol. 15(2):250-266 (2010).
Polytimi et al., "Close to transplant renal artery stenosis and percutaneous transluminal treatment", Journal of Transplantation, vol. 2011, 7 pages (2011).
Rabbat et al., "Interpreting results of coronary computed tomography angiography-derived fractional flow reserve in clinical practice", Journal of Cardiovascular Computed Tomography, vol. 11(5):1-6 (2017).
Sarwal et al., "3-D reconstruction of coronary arteries", Proceedings of the 16th Annual Intl. Conference of the IEEE Engineering in Medicine and Biology Society, Engineering Advances: New Opportunities for Biomedical Engineers, Nov. 3, 1994, pp. 504-505.
Sato et al., "A viewpoint determination system for stenosis diagnosis and quantification in coronary angiogrphic image acquisition", IEEE Transactions on Medical Imaging, vol. 17(1):121-137 (1998).
Seifalian et al., "A new algorithm for deriving pulsatile blood flow waveforms tested using simulated dynamic angiographic data", Neuroradiology, vol. 31:263-269 (1989).
Seifalian et al., "Blood flow measurements using 3D distance-concentration functions derived from digital x-ray angiograms", Cardiovascular Imaging, Chap. 33:425-442 (1996).
Seifalian et al., "Validation of a quantitative radiographic technique to estimate pulsatile blood flow waveforms using digital subtraction angiographic data", Journal of Biomedical Engineering, vol. 13(3):225-233 (1991).
Shang et al., "Vascular active contour for vessel tree segmentation", in IEEE Transactions on Biomedical Engineering, vol. 58(4):1023-1032 (2011).
Shpilfoygel et al., "Comparison of methods for instantaneous angiographic blood flow measurement", Medical Physics, vol. 26(6):862-871 (1999).
Sianos et al., "The Syntax score: an angiographic tool grading the complexity of coronary artery disease", Euro Intervention, vol. 1(2):219-227 (2005).
Siogkas et al., "Quantification of the effect of percutaneous coronary angioplasty on a stenosed right coronary artery", 2010 10th IEEE Intl. Conference on Information Technology and Applications in Biomedicine, Nov. 3-5, 210, pp. 1-4 (2010).
Slomka et al., "Fully automated wall motion and thickening scoring system for myocardial perfusion SPECT: Method development and validation in large population", Journal of Nuclear Cardiology, vol. 19(2):291-302 (2012).
Sprague et al., "Coronary x-ray angiographic reconstruction and image orientation", Medical Physics, vol. 33(3):707-718 (2006).
Sun et al., "Coronary CT angiography: current status and continuing challenges", The British Journal of Radiology, vol. 85:495-510 (2012).
Takarada et al., "An angiographic technique for coronary fractional flow reserve measurement: in vivo validation", International Journal of Cardiovascular Imaging, published online pp. 1-10, Aug. 31, 2012.
Termeer et al., "Visualization of myocardial perfusion derived from coronary anatomy", IEEE Transactions on Visualization and Computer Graphics, vol. 14(6):1595-1602 (2008).
Tomasello et al., "Quantitative coronary angiography in the interventional cardiology", Advances in the Diagnosis of Coronary Atherosclerosis, Chap. 14:255-272 (2011).
Tu et al., Assessment of obstruction length and optimal viewing angle from biplane X-ray angiograms, Int J Cardiovasc Imaging, vol. 26:5-17 (2010).
Tu et al., "In vivo assessment of optimal viewing angles from X-ray coronary angiography", EuroIntervention, vol. 7:112-120 (2011).
Tu et al., "In vivo assessment of bifurcation optimal viewing angles and bifurcation angles by three-dimentional (3D) quantitative coronary angiography", Int J Cardiovasc Imaging, published online Dec. 15, 2011, in 9 pages.
Tu et al., "The impact of acquisition angle differences on three-dimensional quantitative coronary angiography", Catheterization and Cardiovascular Interventions, vol. 78:214-222 (2011).
Tuinenburg et al., "Dedicated bifurcation analysis: basic principles", Int J Cardiovasc Imaging, vol. 27:167-174 (2001).
Voci et al., "Coronary flow: a new asset for the echo lab?", European Heart Journal, vol. 25:1867-1879 (2004).
Weickert et al., "A scheme for coherence-enhancing diffusion filtering with optimized rotation invariance", Computer Vision, Graphics, and Pattern Recognition Group, Technical Report, Computer Science Series, pp. 1-20 (2000).
Weickert, "Anisotropic diffusion in image processing", ECMI, published by Teubner Stuttgart, Germany, 181 pages (2008).
Weickert et al., "A scheme for coherence-enhancing diffusion filtering with optimized rotation invariance", Journal of Visual Communication and Image Representation, vol. 13(1-2):103-118 (2002).

(56) References Cited

OTHER PUBLICATIONS

Wong et al., "Quantification of fractional flow reserve based on angiographic image data", The International Journal of Cardiac Imaging, vol. 28(1):13-22 (2012).
Wong et al., "Determination of fractional flow reserve (FFR) based on scaling laws: a simulation study", Physics in Medicine and Biology, vol. 53:3995-4011 (2008).
Wong et al., "Automated technique for angiographic determination of coronary blood flow and lumen volume", Acad. Radiol. vol. 13:186-194 (2006).
Xu et al., "Snakes, shapes, and gradient vector flow", IEEE Transactions on Image Processing, vol. 7:359-369 (1998).
Yang et al., "Novel approach for 3-D reconstruction of coronary arteries from two uncalibrated angiographic images", IEEE Transactions on Image Processing, vol. 18(7):1563-1572 (2009).
Youssef et al., "Role of computed tomography coronary angiography in the detection of vulnerable plaque, where does it stand among others?", Angiology, vol. 1(2):1000111-1-1000111-8 (2013).
Zhang et al., "Quantification of coronary microvascular resistance using angiographic images for volumetric blood flow measurement: in vivo validation", Am J Physio Heart Circ vol. 300(6):H2096-H2104 (2011).
Invitation to Pay Additional Fees in Application No. PCT/IB2023/051186, mailed on May 25, 2023, in 33 pages.
International Search Report and Written Opinion in application No. PCT/IB2023/051186, mailed on Jul. 17, 2023, in 15 pages.
Barrett et al., "Interactive live-wire 1-3 boundary extraction", Medical Image Analysis, Oxford University Press, vol. 1(4):331-341 (1997).
Chen et al., "3-D reconstruction of coronary arterial tree to optimize angiographic visualization", IEEE Transactions on Medical Imaging, vol. 19(4):318-336 (2000).
Marchenko, et al., "Vascular editor: from angiographic images to 3D vascular models", Journal of Digital Imaging, vol. 23:386-398 (2010).
Wang et al., "Optimal viewing angle determination for multiple vessel segments in coronary angiographic image", IEEE Transactions on Nuclear Science, vol. 61(3):1290-1303 (2014).
Wang et al., "Global optimization angiographic viewing angles for coronary arteries with multiple segments", 35th Annual International Conference of the IEEE EMBS, pp. 2640-2643, Osaka, Japan, Jul. 3-7, 2013.
Pijls et al., "Experimental basis of determining maximum coronary, myocardial, and collateral blood flow by pressure measurements for assessing functional stenosis severity before and after percutaneous transluminal coronary angioplasty", Circulation, vol. 87:1354-1367 (1993).
Rimac et al., "Clinical value of post-percutaneous coronary intervention fractional flow reserve value: A systematic review and meta-analysis", Am Heart J. vol. 183:1-9 (2017).
Kern, "Serial lesion FFR made simple", Cath Lab Digest, vol. 20(9)(2012), in 2 pages, [retrieved on on Sep. 25, 2024], retrieved from the internet: https://www.hmpgloballearningnetwork.com/site/cathlab/articles/serial-lesion-ffr-made-simple.
Nijjer et al., "Pre-angioplasty instantaneous wave-free ratio pullback provides virtual intervention and predicts hemodynamic outcome for serial lesions and diffuse coronary artery disease", JACC: Cardiovascular Interventions, vol. 7(12):1386-1396 (2014).
Volcano Corporation, iFR instant wave-free RatioTM, "An introduction to iFR ScoutTM Pullback Measurements, Moving from Justified PCI to Guided PCI", 2015, in 11 pages, [retrieved on Aug. 29, 2024]. Retrieved from the Internet <URL: https://www.usa.philips.com/c-dam/b2bhc/master/education-resources/technologies/igt/iFR-Scout-In-Service.pdf>.
International Preliminary Report on Patentability and Written Opinion in application No. PCT/IB2023/051186, dated Aug. 6, 2024, in 8 pages.
Hwang et al., "Diagnostic performance of resting and hyperemic invasive physiological indices to define myocardial ischemia", JACC: Cardiovascular Interventions, vol. 10(8):751-760 (2017).
Neng et al., "Pre-stenting angiography-FFR based physiological map provides virtual intervention and predicts physiological and clinical outcomes", Catheterization and Cardio vascular Interventions, Wiley-Liss, New York, NY, vol. 101(6):1053-1061 (2023).

* cited by examiner

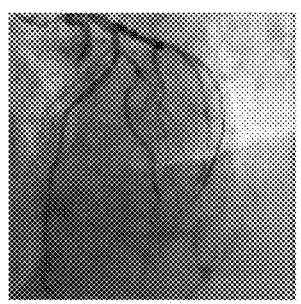
FIG. 6A  FIG. 6B
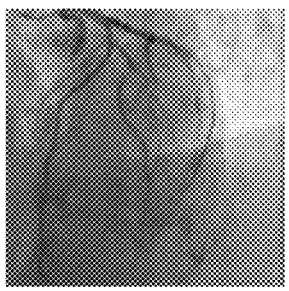
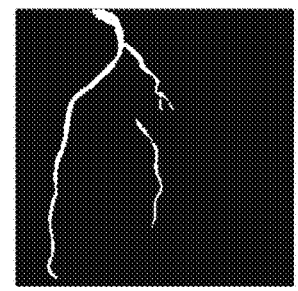
FIG. 6C  FIG. 6D
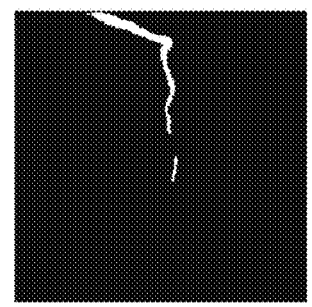
FIG. 6E  FIG. 6F
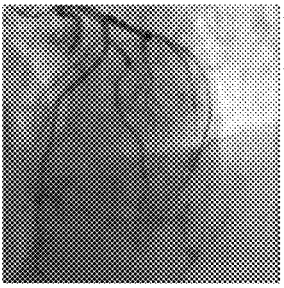
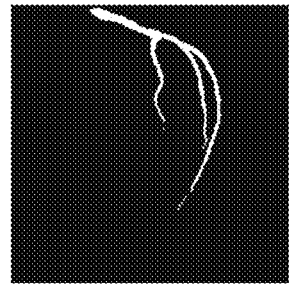
FIG. 6G  FIG. 6H
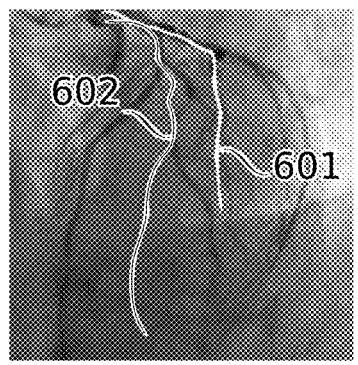
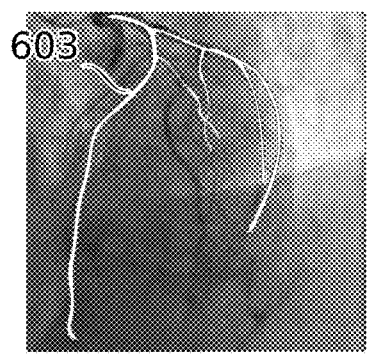
FIG. 6J  FIG. 6K

SYSTEM AND METHOD FOR MACHINE-LEARNING BASED SENSOR ANALYSIS AND VASCULAR TREE SEGMENTATION

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation of International application No. PCT/IB2023/051186 titled "SYSTEM AND METHOD FOR MACHINE-LEARNING BASED SENSOR ANALYSIS AND VASCULAR TREE SEGMENTATION" and filed Feb. 9, 2023, which claims priority to U.S. Prov. Patent App. No. 63/308,550 titled "VASCULAR TREE SEGMENTATION" and filed on Feb. 10, 2022, the disclosure of which is hereby incorporated herein by reference in its entirety.

BACKGROUND

Technical Field

The present invention, in some embodiments thereof, relates to the field of vascular imaging and more particularly, but not exclusively, to vascular computer modelling and segmentation.

Description of Related Art

Arterial stenosis is one of the most serious forms of arterial disease. Its severity can be determined by estimations of geometric measurements or flow rate of the vessels, typically through invasive procedures. However, by creating a vascular computer model using images of the vessel, it is possible to determine the severity of an arterial stenosis without the need for invasive procedures. Vascular imaging provides characterizations of blood vessel locations needed to generate a vascular computer model. However, vascular imaging requires vascular segmentation and feature identification as a preliminary stage of image-based measurement of the vascular state.

Currently, many stages of vascular segmentation and feature identification can be performed using an automated analysis. Automatic identification of vascular positions is a potential advantage, since it can reduce the time, effort, skill, and/or attention required of a human operator to identify these positions entirely manually, even if the user must manually confirm or correct a vascular tree afterwards.

Despite the ability to perform automated analysis, relevant image features produced from vascular segmentation and feature identification are often of low contrast. The image features may also be embedded in a complex environment including elements of ambiguous geometry and extraneous features that causes the output to be error prone.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 6A, 6B, 6C, 6D, 6E, 6F, 6G and 6H depict an X-ray angiogram image (depicted in each of FIGS. 6A, 6C, 6E, and 6G) together with different mask-type ML-based vascular identifier outputs (FIGS. 6B, 6D, 6F, 6H) corresponding to different anatomically distinct vascular types, according to some embodiments of the present disclosure.

FIG. 6J shows two superimposed path-type ML-based vascular identifier outputs, according to some embodiments of the present disclosure.

FIG. 6K shows a segmented result, produced based on the use of the various correct and partially incorrect information available from the ML-based vascular identifier outputs shown in FIGS. 6B, 6D, 6F, 6H, and 6J, according to some embodiments of the present disclosure.

DETAILED DESCRIPTION

Introduction

Figure 1:
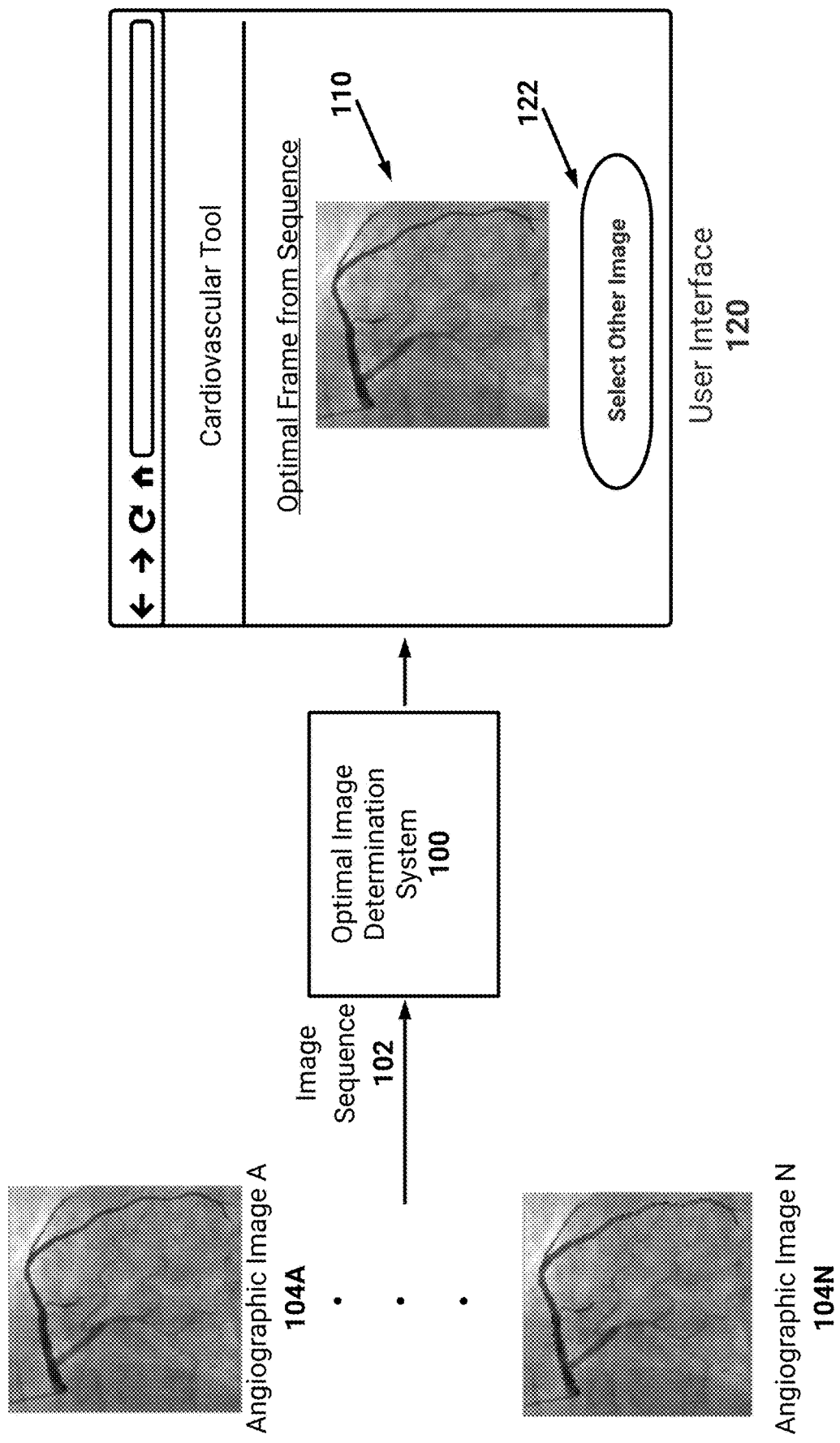
FIG. 1 is a block diagram of an optimal image determination system outputting an optimal angiographic image based on an input image sequence.

This application describes, among other things, techniques to select a vascular image, from a sequence of vascular images, which provides enhanced contrast, enhanced visibility of vessels, enhanced image quality, and so on. As will be described, the selected vascular image may be used for further analyses, such as forming a three-dimensional model of at least a portion of a patient's heart. The selected vascular image may also be used as part of an automated process or workflow in which a user can identify vessels in the vascular image, adjust an automated determination of vessels in the vascular image, and so on. The vascular images described herein may represent angiographic images in some embodiments, with each sequence of vascular images depicting the portion of the patient's heart from a particular viewpoint. As may be appreciated, combining vascular images from different viewpoints may allow for a three-dimensional view of the portion to be generated. At present such three-dimensional views are prone to inaccuracies due to the vascular images suffering from movement errors, differences in cardiac phases when the images were obtained, and so on. This disclosure describes techniques to optimize, or otherwise enhance, the selection of a subset of these vascular images to reduce such inaccuracies.

As will be described, a system described herein may implement one or more machine learning models, optionally in conjunction with classical computer vision techniques, to determine an optimal image from among a multitude of inputted vascular images. The system may be, for example, the optimal image determination system 100 described below. For example, a machine learning model may include a neural network (e.g., a deep learning model, a convolutional neural network). In this example, the system may compute a forward pass through the machine learning model to generate output utilized in the determination. In some embodiments, the neural network may output segmentation masks for at least some of the received vascular images. These segmentation masks may segment vessels depicted in the vascular images.

The system may analyze the above-described segmentation masks, for example determining size or length scores associated with depicted vessels. Using these scores, the system may select a top threshold number of images. The system may analyze the threshold number of images to identify an optimal image. For example, the system may compute contrast scores indicating measures of contrast or other image quality for the vessels depicted in the images. The optimal image may represent, in some embodiments, an image with the highest scores or combination of scores. Through this automated selection of an optimal image, resulting downstream workflows such as three-dimensional model generation may allow for enhanced accuracy while lessening the need and time spent for manual adjustments by a human operator post-analysis.

Introduction—Background

Angiographic images are commonly used to provide detailed views of a patient's heart. These images may be obtained, for example, by injecting a radio-opaque contrast agent into the patient's blood vessels and obtaining X-ray images (e.g., via fluoroscopy). While these images provide detailed views, due to the use of X-rays medical professionals may prefer to limit an extent to which angiographic images are obtained. Thus, it is paramount that techniques are employed for downstream processes which accurately leverage existing angiographic images.

One example downstream process includes generating a three-dimensional model, or vascular tree, of a portion of patient's heart. For example, angiographic images of different views of the portion may be obtained. In this example, the different views may depict different views of vessels. As known by those skilled in the art, these vessels may be correlated to identify unique vessels depicted in the views. For example, automated or semi-automated techniques may be leveraged to allow for such correlation. The views may be combined to generate a three-dimensional view of these vessels. The views may also be combined to allow for an easy-to-understand graphical representation of a vessel tree which indicates vessels which are upstream and/or downstream from each other.

Typically, an image sequence of angiographic images will be obtained while an imaging system (e.g., a c-arm) is pointing at the portion of the patient's heart. For example, 5, 10, 20, and so on, angiographic images may be obtained. As may be appreciated, these angiographic images may vary in their usefulness with respect to the above-described downstream processes. For example, a subset of the angiographic images may have errors due to movement or shaking of the imaging system. As another example, a subset may have errors associated with contrast. As another example, the angiographic images may depict the portion of the heart as the heart is in different cardiac phases. For this example, certain cardiac phases may be associated with less detail, size, and so on, of vessels in the resulting angiographic images.

Additionally, errors or ambiguities may relate to:

Use of angiographic images which are two-dimensional projections of complex three-dimensional vasculature, creating the spurious appearance in single images of vascular connections which don't actually exist.

Potentially, blood vessels hide one another due to overlap.

Contrast agent used to reveal the vasculature may fill blood vessels of interest incompletely, unevenly, weakly and/or sporadically.

Indications of other body structures, and sometimes outright artifacts may appear in the image, creating image "noise" which interferes with identification of targets of interest.

There are technological and/or safety limitations on image resolution and radiant energy exposure, which can limit, for example, image detail and/or contrast.

Cardiac vasculature moves with the beating of the heart and/or respiration, and the patient may themselves move; so that there is even a problem of selecting which 3-D shape of the vasculature is to be reconstructed.

Typically, a user of a software tool may view images in an image sequence and select one which appears to depict the vessels most clearly. For example, the user may zoom into the images and identify potential errors which are evident in these images. Certain software tools may allow for limited automated techniques to surface potential errors. For example, classical computer vision techniques may be used to detect motion artifacts.

In contrast, the disclosed technology leverages machine learning models specifically trained to address such errors and ambiguities.

Introduction—Optimal Image Selection

The system includes one or more machine learning models, such as convolutional neural networks, which are used by the system to output a particular angiographic image from an image sequence which will be used in downstream processes. The particular angiographic image is referred to as an optimal angiographic image or image frame herein.

For example, the system receives an image sequence from an angiographic imaging tool or system (e.g., a c-arm). In this example, the imaging tool or system may be rotated such that angiographic images depict, or otherwise include, a portion of a patient's heart from a particular viewpoint. The image sequence may thus include angiographic images taken at different points in time from the particular viewpoint.

The patient's heart will beat and therefore transition between cardiac phases. The angiographic images in the image sequence may therefore depict the portion of the patient's heart in different cardiac phases. For example, a first image may depict the heart while it is in a systole phase. As another example, a second image may depict the heart while it is in a diastolic phase. As known by those skilled in the art, the second image may provide a clearer, more advantageous, view of vessels in the portion of the heart. For example, the second image may depict the portion as being lengthened and in more of a relaxed state as compared to the first image.

As will be described, the system may leverage machine learning techniques to identify images in the image sequence which depict the heart in a particular cardiac phase. In some embodiments, the particular cardiac phase may be an end-diastolic phase. The machine learning techniques may include a convolutional neural network which is trained to label, or otherwise indicate a value indicative of, an image depicting the heart in the particular cardiac phase. While a convolutional neural network is described, as may be appreciated other machine learning models may be used. For example, fully-connected networks, recurrent neural networks, attention-based networks, and so on may be used.

The system may then use machine learning techniques, or optionally classical computer vision techniques (e.g., application of a Frangi filter, and so on), to output segmentation masks for these identified images. For example, the segmentation masks may have pixel values assigned based on whether the pixel forms part of a vessel. In this example, a segmentation mask may include binary color (e.g., black, and white) with a first color indicating a pixel which does not form part of a vessel and a second color indicating a pixel which does form part of a vessel. While binary colors are described, as may be appreciated each pixel may be assigned or value or likelihood indicative of the pixel forming part of a vessel.

The segmentation masks may then be analyzed to identify size or length metrics associated with vessels (herein referred to as 'mask scores'). For example, a mask score may indicate a length associated with a vessel. In this example, the length may indicate a length associated with a centerline from a first end of a vessel to a second end of the vessel. As another example, a mask score may indicate a fill score (e.g., an area) associated with a vessel. In this example, the fill score may indicate a number of pixels which form the vessel, or an estimated area encompassed by the vessel. Use of the mask scores allows for removal of images where a contrast agent fills the patient's vessels incompletely, unevenly, weakly, and/or sporadically. For example, these images may have segmentation masks which include vessels appearing in disconnected segments or with reduced length or size. A threshold number of the segmentation masks may be maintained, for example 3, 5, 7, 9, 10, 12, and so on may be maintained as having the greatest mask scores.

The system may then analyze angiographic images which were used to generate the threshold number of segmentation mask. For example, the system may determine quality or clarity scores for the angiographic images. Quality or clarity scores are described herein as contrast scores and are used to indicate images with the best contrast. While contrast scores are described herein, additional quality or clarity scores may be used and fall within the scope of the disclosed technology. For example, scores associated with one or more of sharpness, focus, motion artifacts, image artifacts, and so on, may be used. An optimal image may then be selected from the analyzed angiographic images based on the quality or clarity scores.

As described in FIG. 1, the optimal image may be presented to an end-user in a user interface. In some embodiments, the end-user may view the optimal image and use it for down-stream processes. For example, the end-user may mark, or otherwise identify, vessels in the optima image. The end-user may also select a different image from the above-described image sequence.

In some embodiments, and as will be described, different machine learning models may be used based on whether the image sequence depicts a left side of right side of the patient's heart. For example, the left-side images may depict the left anterior descending artery (LAD) and the circumflex artery (LCX) while the right-side images may depict the right coronary artery (RCA). In some embodiments, a machine learning model (e.g., a convolutional neural network) may be used to indicate whether the image sequence depicts the left-side or right-side. For example, the machine learning model may output a classification.

The disclosed technology therefore addresses technical problems and provides technical solutions to these problems. For example, there may be no need to unnecessarily increase image resolution or radiant energy exposure during X-rays due to the intelligent selection of angiographic images. As another example, use of machine learning models allows for accurate classification and determination of information to reliably select an optimal image from an image sequence. Without such techniques, resulting three-dimensional models of a heart, or information derived from angiographic images, may include errors and inaccuracies which negatively affect patient outcome.

In this disclosure, the term "ML-based vascular identifier" refers to machine learning outputs. The term "vascular identifier" more generally encompasses both ML-based vascular identifiers and computer processing-based methods of identifying vascular regions in images (e.g., formula-based methods, such as classical computer vision techniques). Example classical computer vision techniques may include a kernel filter (e.g., a skeletonization filter or Gaussian filter), an affine transform (e.g., a combination of translation, scaling, rotation, flipping and/or shear), a bit mask, a component analysis technique (e.g., principle component analysis), and a domain transform (e.g., a Fourier transform between frequency and spatial domains). In particular, in some embodiments of the present disclosure, a version of a filter type known in the art as a Frangi filter is used to assist in detecting the generally tubular structures of which vasculature is composed.

In this application, and as an example, FIGS. 1 and 10A-12 may be relevant to techniques for determining an optimal image frame from an image sequence. FIGS. 2-9G may be relevant to techniques for determining vessels in vascular images based on segmentation masks, addressing errors in determining vessels and/or segmentation masks, and so on. In some embodiments, the optimal image may be analyzed via the techniques described in FIGS. 2-9G to accurately identify vessels associated with vessel trees or arteries (e.g., left or right arteries), address errors, and so on. Thus, the system described herein may determine an optimal image and then analyze the image, for example via segmentation masks or other ML-based vascular identifier outputs, as described in FIGS. 2-9G.

These and other features will now be described in detail.

Block Diagram

FIG. 1 illustrates a block diagram of an optimal image determination system 100. The system 102 may represent, for example, a system of one or more computers or processors which implements the techniques described herein. In some embodiments, the system may be in communication with an imaging system or tool which obtains vascular images of a patient. As described herein, the vascular images may be angiographic images. In some embodiments, the vascular images may be computed tomography images or scans.

In the illustrated embodiment, the optimal image determination system 100 is receiving an image sequence 102 which includes angiographic images 104A-104N. The image sequence 102 may depict a portion of a patient's heart from a certain angle or viewpoint. The angiographic images 104A-104N can be obtained, in some embodiments, by user input. For example, the user may input a DICOM file which includes a series of angiographic images or a video from which the angiographic images can be extracted. The images 104A-104N may be captured at a particular frequency (e.g., 5 Hz, 7 Hz, 10 Hz, 30 Hz. and so on) over an amount of time, resulting in potentially large numbers of images.

The images 104A-104N may be taken during a period of vascular contrast agent injection and washout. As already described, within a single image, there may arise ambiguities in vascular structure due to vascular portions which cross and/or approach each other. Since the heart is hollow, and since X-ray images image all through the heart, some of these ambiguities arise from blood vessels which are actually in completely different 3-D planes (e.g., on opposite sides of the heart). As a result, blood vessels which appear to be near each other in a static 2-D plane may nonetheless have different patterns of motion, inconsistent with them actually lying within the same tissue bed. This inconsistency may be viewed as latent information about vascular connectivity. Another form of temporal information arises from the dynamics of vascular filling. Blood vessels which connect to one another should be highly correlated in the dynamics of their filling (darkening) and emptying (lightening) upon injection of vascular contrast agent, and then again as the contrast agent washes out. Unconnected blood vessels, even if they appear to intersect in an image, may be less correlated in their filling dynamics.

In view of these ambiguities, certain angiographic images in the sequence 102 may provide a clearer, and more accurate, depiction of vessels in the patient's heart. Thus, the optimal image determination system 100 may determine an optimal image 110 from the image sequence 102 which represents the best image from a particular angle or viewpoint. As will be described, for example with respect to at least FIGS. 10A-12, the optimal image may be identified using machine learning techniques optionally in combination with classical computer vision techniques. For example, the optimal image may have an optimal, or otherwise aggregate best, combination of features including, for example, size of depicted vessels, clarity of the image, connectedness of vessels, and so on. With respect to connectedness, the optimal image may depict a vessel as being substantially continuous without separations.

The optimal image 110 may be used by an end-user as medical data for example downstream processes. For example, the system 100 may identify locations, or boundaries, of vessels in the optimal image 110. In this example, the end-user may adjust these locations or boundaries and optionally identify locations or boundaries of other vessels in the image 110. As another example, the end-user may obtain multiple (e.g., 2, 3, 5, and so on) optimal images from different image sequences. For this example, the end-user may cause a three-dimensional model or vascular tree to be generated. Thus, the optimal images may represent images determined to be the most advantageous for use in these down-stream processes from their respective image sequences.

In FIG. 1, a user interface 120 is illustrated as including optimal image 110. The user interface 120 may be generated, in some embodiments, by the system 100. For example, the system 100 may execute software which causes presentation of the user interface 120. The user interface 120 may also be presented by a user device of the end-user. For example, the system 100 may provide information for inclusion in the user interface 120 as rendered by the user device. In this example, the system 100 may be in wired or wireless communication with the user device. As an example, the system 100 may be associated with a web application.

In some embodiments, the user interface 120 may include a button or other selectable object 122 to cause selection of a different optimal image. For example, the end-user may select button 122 to view other angiographic images in the image sequence 102. In this example, the user interface 120 may update to present at least some of these angiographic images. The end-user may thus override the optimal image 110 to select a different optimal image. In some embodiments, such an override may be used to update the machine learning models described herein.

The user interface 120 may be used, for example, to identify an image sequence for analysis. For example, the end-user may provide user input which causes the user interface 120 to respond to selection of an image sequence. Once selected, the selection of the image sequence may trigger the system 100 to determine an optimal image as described herein. The optimal image may then be shown or otherwise included in the user interface 120 as illustrated in FIG. 1. In some embodiments, an animation or movie may play in the user interface 120 with the animation or movie being formed based on the image sequence. The optimal image may be identified, for example highlighted, text presented proximate to it, or the animation or movie may pause on the optimal image for a threshold amount of time while playing. In this way, the end-user may view the optimal image in the context of the image sequence. As described above, the end-user can select a different optimal image. For example, the end-user may interact with button 122. As another example, the end-user may select an image during the animation or movie of the image sequence.

Another example downstream process may include, for example, a certain image location as being part of a blood vessel (a "vascular portion"), a certain image location as being part of a particular (anatomically identified) blood vessel, a certain image location as being more particularly part of a path definition extending along vascular portions (e.g., a general or anatomically identified vascular center line), a certain image location as being a "root" location of a vascular tree (e.g., an ostium of a coronary artery), and/or of a certain image or image portion as being a suitable target for another image processing method.

From image inputs (e.g., image inputs showing discernible structural features of cardiac vasculature), a vascular identifier may produce a data structure in which there is some correspondence with positions in the image, e.g., a 1:1 correspondent between identifications and pixels (other types of scaled, binned, or otherwise transformed correspondences are not excluded). The data structure may be in any form of representation suitable to describe identification results; for example, scalar, array, matrix, linked list, or another form of representation. More particularly, the data structure may be a mask; for example, a binary image with a pixel per pixel of the input image, values of mask pixels being set according to the identification result of corresponding input image pixels. In some embodiments, the data structure is a list of locations in the input image which have (or do not have) a certain identification (e.g., identified as representing a portion of a certain vascular centerline). Image locations may be expressed, for example, as absolute locations, or as locations relative to other locations. A path through an image, for example, may be expressed as either of a binary image mask or a list of image locations. A vascular identifier may optionally produce a data structure which performs classification of an image as a whole. For example, the data structure may classify the image according to its likelihood of being an image obtained near a certain phase of the heartbeat cycle.

Types of Vascular Identifiers/Vascular Identifier Outputs

FIGS. 2-9G describe example techniques which may be implemented using the optimal image determination system 100 described herein. As will be described, the system 100 may generate output (e.g., ML-based vascular identifiers, vascular identifiers) which may be included in a user interface (e.g., user interface 120). In some embodiments, an ML-based vascular identifier may include a segmentation mask generated from an angiographic image. A ML-based vascular identifier may also represent, in some embodiments, output from a machine learning model such as score, value, likelihood, classification, and so on.

Figure 2:
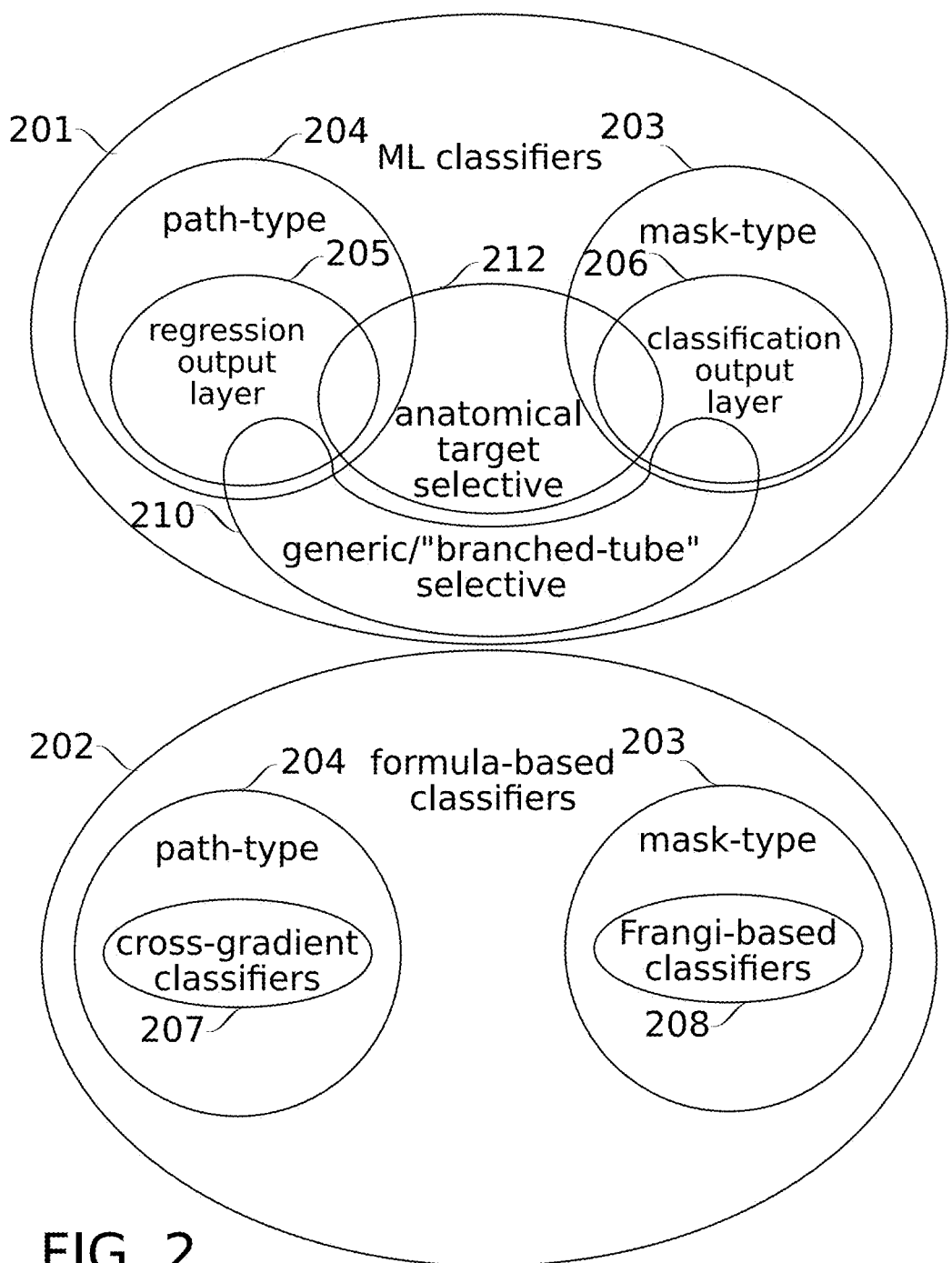
FIG. 2 is a schematic diagram of different algorithmic components from among which vascular identifiers may be selected, according to some embodiments of the present disclosure.

Reference is now made to FIG. 2, which is a schematic diagram of different algorithmic components from among which vascular identifiers may be selected, according to some embodiments of the present disclosure. The diagram is form of Venn diagram, wherein regions of the diagram ("type-regions") are characterized by which labeled closed-boundary regions they fall within. The type-regions represent groups of algorithmic components with properties indicated by the labels, and further described herein.

Type-regions 201, 202 represent, respectively, the generic types of ML-based vascular identifiers and formula-based vascular identifiers, respectively, which should be understood in either case as being vascular identifiers available for and suitable for use in the identification of vasculature from vascular image. More particularly, in some embodiments, the vascular identifier is suitable for use in the identification of contrast-agent filled cardiac blood vessels in X-ray angiogram images of a living heart.

Within either of the type-regions 201, 202 may be distinguished more particularly a type-region 203 of mask-type vascular identifiers and a type of region 204 path-type vascular identifiers (representations of type-regions 203, 204 are split among type-regions 201, 202 to reduce visual clutter). Mask-type vascular identifiers, herein, are understood to be vascular identifiers that provide output which expresses a likelihood (optionally a threshold likelihood) of a particular image pixel being in or not in a suitably defined vascular target. Characteristics of mask-like vascular identifier outputs include:

Being non-directional, e.g., the vascular identifier output as such does not indicate vascular orientation.

Being "blobby"—that is, having width of arbitrary size in any direction from any particular point within the mask.

The output from a path-type vascular identifier in contrast, is directional; for example, locations identified are in an order which the vascular identifier output defines. The path, moreover, is skeletal (not blobby); e.g., having no representation of width as such.

It should be noted that the outputs of mask-type and path-type vascular identifiers can be inter-converted by various processing methods to have the directionality/blockiness of the opposite type. For example, a blob can be skeletonized, and a path can have different widths assigned to locations along its longitudinal extent. What is counted herein for purposes of type-region assignment is the form of the initial classification. Parenthetically, it may be also noted that a vascular identifier could, in principle, combine even within its initial classification, both the directionality of a path-type output and the arbitrary width of a mask-type output (that is, these two properties are not logically incompatible). Nor is it excluded that there are vascular identifiers sharing none of the distinguishing properties of path-type and mask-type vascular identifiers. However, unless otherwise noted, vascular identifiers used in the examples given can be reasonably understood as belonging to one of the two types just given.

Corresponding to the initial classification type, there may be understood to be an underlying difference in how mask-type and path-type vascular identifiers use the information available to them which traces to differences in their underlying models. In particular, path-type vascular identifiers operate based on the model assumption that there is a path—an ordered set of locations which extend between a starting position and an ending position. From the further knowledge or assumption that two non-adjacent locations are on the path, a path-type vascular identifier relies on there being a third location between them. The model of a mask-type vascular identifier may work from model assumptions that assess pixel properties and patterns without reliance on such global properties.

It is not forbidden for embodiments of the present disclosure that a vascular identifier may use (for example) both path-like information and pattern-like information to produce its output, and this may be true even if the output itself is strictly path-type or mask-type). Indeed, and particular in the case of for an ML-based vascular identifier, it may be difficult to restrict, and perhaps infeasible to determine what type of information is being used. However, even in that case, it may be understood that the use of path-type training data vs. mask-type training data will tend to influence the training process that produces the ML-based vascular identifier, so that path-like or pattern-like information is emphasized to a greater or lesser degree.

Accordingly, in some embodiments of the present disclosure, there is provided for use a mask-type vascular identifier. The mask-type vascular identifier may be in turn an ML-based vascular identifier. In some embodiments, the vascular identifier is more particularly characterized by having a classification-type output layer (e.g., as a member of type-region 206), as also described hereinabove. The mask-type ML-based vascular identifier may be one trained using mask data, with the mask data identifying which portions of a vascular image should be considered as vascular portions.

In some embodiments, the mask-type vascular identifier is a formula-based vascular identifier, for example, a Frangi filter-based vascular identifier 207 (AF Frangi et al., "Multiscale Vessel Enhancement Filtering", Medical Image Computing and Computer-Assisted Intervention—MICCAI'98 Lecture Notes in Computer Science 1496/1998: 130). Variations of this method have also been described in more recent literature. More general examples of formula-based mask-type vascular identifiers include edge detectors and threshold detectors. The Frangi filter-based vascular identifier (and its variations) may be characterized as "tube detectors", insofar as they are designed to highlight image features which correspond to the image appearance of tubes (which are characteristic of vasculature), such as their possession of a direction of greater longitudinal extent, their possession of a more-or-less constant or slowly changing diameter, their cross-sectional brightness profile, and/or other properties.

Additionally, or alternatively, in some embodiments of the present disclosure, there is provided for use a path-type vascular identifier. The path-type vascular identifier may in turn be an ML-based vascular identifier. In some embodiments, the vascular identifier is more particularly characterized by having a regression-type output layer (e.g., as a member of type-group 205), as also described hereinabove. The path-type ML-based vascular identifier may be one trained using path data, with the path data identifying locations lying along vascular portions. In some embodiments, the locations identified are vascular centerlines. The centerlines are optionally and advantageously identified as representing the geometrical center of blood vessels; however, there is no general restriction requiring this. In some embodiments, additionally or alternatively, the path locations identified are vascular edges.

In some embodiments, the path-type vascular identifier is a formula-based vascular identifier 208. Such a path-type vascular identifier may, for example, proceed away from a seed location, travelling in one or two directions along the minimum gradient of the image's local brightness values. When the seed location is within a blood vessel (e.g., a dark blood vessel against a brighter background), this may tend to constrain the direction of travel to be about parallel to the direction of the blood vessel itself, insofar as the vessel is relatively narrow (making a steep gradient) compared to its length (along which the gradient is shallower). The path may also trend toward the vascular center since lower overall intensity levels there may also lead to lower gradients. Refinements to this general idea may include different methods of selecting seed locations, resolving stopping conditions, and/or bridging vascular crossings and/or gaps in vascular brightness.

Apart from its usefulness in description of some embodiments of the present disclosure, the distinction between path-type and mask-type vascular identifiers is of relevance to the problem of vascular identification because it allows pointing out-more generally—that even though two vascular identifiers may both be designed to solve the same problem of "identifying blood vessels" in an image, their underlying model differences drive them to somewhat different solutions.

In the case of two ML-based vascular identifiers, this can be true even when the vascular identifiers were trained using the same basic underlying images. This is, in turn, practically important, because any given vascular identifier is likely to make a certain number of mistakes. It will identify a blood vessel where there is none or fail to do so when one should have been identified. Furthermore, the pairing of path-type and mask-type vascular identifiers provides an example of two different types of vascular identifier which tend to make different mistakes. An understanding of the differences there can be converted in turn to a solution which allows complementary use of a plurality of vascular identifiers to achieve results more accurate than any individual vascular identifier (or type of vascular identifier) alone.

The principle of complementarity can be carried more generally to other type-distinctions, including some indicated in FIG. 2. For example, in some embodiments, one or more ML-based vascular identifiers are trained to identify a selective anatomical target, consisting, e.g., not of blood vessels generally (e.g., as may be true of generic/"branched-tube" selective ML-based vascular identifiers 210), but more particularly of a particular, anatomically defined vascular target such as the LAD, LCX, RCA, and/or sub-tree vessels thereof (these are examples of targets which may be designated for anatomical target selective ML-based vascular identifiers 212). It should be emphasized that there is no particular technological limitation which prevents training ML-based vascular identifiers of the generic type 210, or on a somewhat more selective type such as cardiac vasculature generally. However, the inventors have found that training ML-based vascular identifiers on an anatomically restricted range of blood vessels has potential advantages for accuracy of identification and/or the amount of training data needed to reach an acceptable level of accuracy. There may be a further advantage when reconstructing 3-D positions of blood vessels using images taken from different angles. If it is clear which blood vessel is, e.g., the LAD or LCX in each image, then the problem of matching blood vessel coordinates is potentially simplified and/or made less error prone.

Another potential advantage of such an approach is that whatever the vessel-type specialized ML-based vascular identifier identifies as vascular is by this fact also identified as belonging to a particular anatomically defined vascular type. Identification may be relevant, e.g., for analysis of vascular pathologies, wherein the severity of the pathology is judged in part based on which anatomically identified portion of the vasculature is pathological.

The ability of machine learning techniques to create anatomically selective vascular identifiers by suitable selection of training data is, moreover, a potential advantage over the use of formula-based vascular identifiers. For formula-based vascular identifiers, the parameters available for adjustment are not necessarily suited to making anatomical selections of the type needed. For example, Frangi-based algorithms typically have a free parameter which can be adjusted to tune which vascular diameter(s) are detected. However, cardiac blood vessels of interest such as the LAD and LCX not only tend to share similar vascular widths, but also themselves vary in width along their length-so a single width, or range of widths, is not particularly distinguishing. While it may be possible to develop a distinguishing vascular identifier, given sufficient investigation, formula-based vascular identifiers expose no pre-existing "knob" (parameter) which is equivalent in flexibility to the adjustment of training data which is available in the generation of ML-based vascular identifiers.

Anatomically Selective ML-Based Vascular Identifiers

Mask-Type ML-Based Vascular Identifiers

Figure 3A:
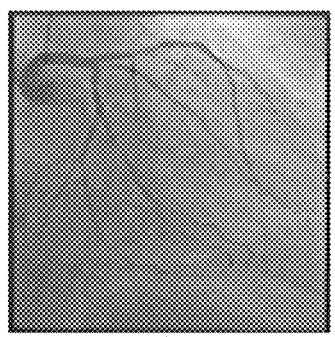
FIGS. 3A, 3B, 3C, 3D, 3E, 3F, 3G and 3H depict an X-ray angiogram image (depicted in each of FIGS. 3A, 3C, 3E, and 3G) together with different mask-type ML-based vascular identifier outputs (FIGS. 3B, 3D, 3F, 3H) corresponding to different anatomically distinct vascular types, according to some embodiments of the present disclosure.
Figure 3B:
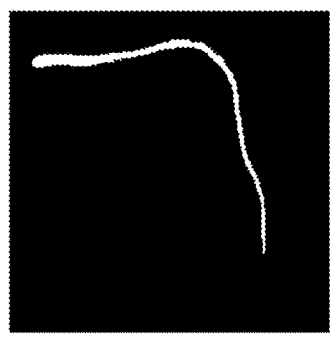
Figure 3C:
Figure 3D:
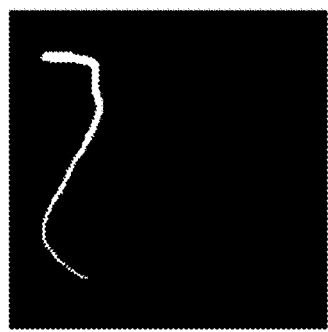
Figure 3E:
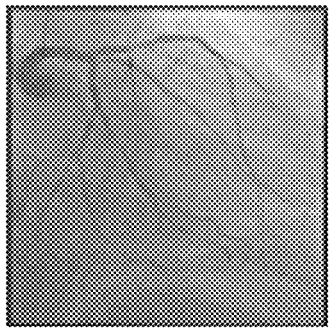
Figure 3F:
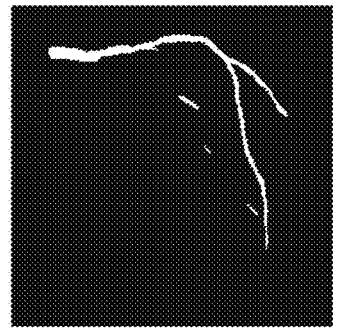
Figure 3G:
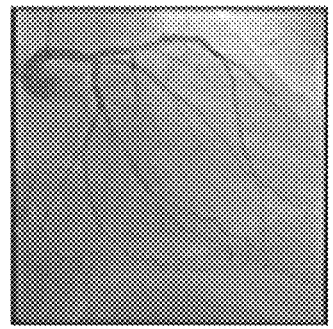
Figure 3H:
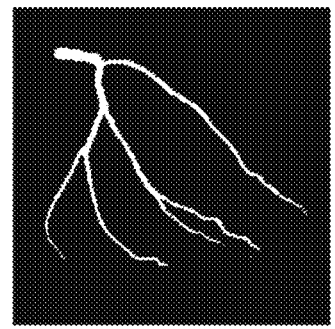

Reference is now made to FIGS. 3A-3H, which depict an X-ray angiogram image (depicted in each of FIGS. 3A, 3C, 3E, and 3G) together with different mask-type ML-based vascular identifier outputs (FIGS. 3B, 3D, 3F, 3H) corresponding to different anatomically distinct vascular types, according to some embodiments of the present disclosure. FIG. 3B shows an LAD mask, FIG. 3D shows an LCX mask, FIG. 3F shows a mask comprising the LAD sub-tree (the LAD and its diagonals or branches), and FIG. 3H shows a mask comprising the LCX sub-tree (the LCX and its marginals or branches).

Each of FIGS. 3B, 3D, 3F, 3H was generated from the same image input using a different respective ML-based vascular identifier trained using a training data set specific for the vascular type identified. In some embodiments, the training data set of a given ML-based vascular identifier comprises a large set of images (e.g., more than 1000 images, more than 10000 images, or another number of images), for each of which a mask is defined identifying the targeted, anatomically identified vascular type.

It may be readily understood that from this set of images, each of the LCX and the LAD are distinguishable from the rest of their respective sub-tree vessels by observing which vascular regions in the whole sub-tree vascular identifier output only, and which are in the corresponding single-vessel ML-based vascular identifier's output as well. However, the images potentially require additional algorithmic processing to realize this distinction. Thus, four different vascular types may be identified in a single image, based on the application of four different ML-based vascular identifiers to the image.

It should be noted that the identifications shown in this set of examples are relatively error-free, although it may be noted, e.g., that FIG. 3F shows a small number of disconnected blobs, at least some of which appear to be more appropriately identified as part of the LCX sub-tree. Following examples will describe various types of detection errors in the ML-based vascular identifier outputs, and how they may be addressed through combinations of vascular identifier outputs.

Path-Type ML-Based Vascular Identifiers

Figure 4:
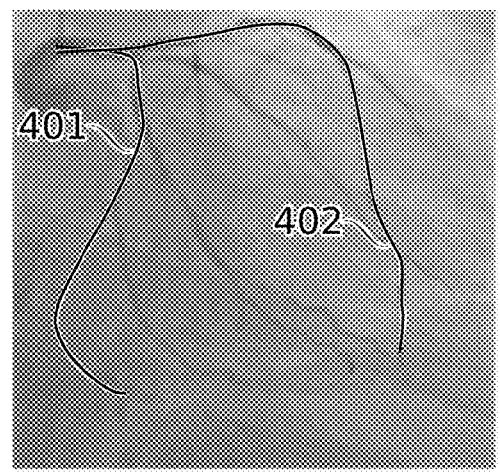
FIG. 4 shows two superimposed path-type ML-based vascular identifier outputs, according to some embodiments of the present disclosure.

Reference is now made to FIG. 4, which shows two superimposed path-type ML-based vascular identifier outputs 401, 402, according to some embodiments of the present disclosure. Path 401 extends along the LCX, and path 402 extends along the LAD.

In this case, the ML-based vascular identifiers used were of the regression type, and training data used were not blob-like masks, but rather paths. In part, regression type training proceeds by "teaching" the ML-based vascular identifier to adjust output path positions to reduce deviation in position from paths in the training set, which is a type of regression problem. The trained vascular identifiers are then expected to produce useful vascular identifications when provided with image data not used as part of their training data set. The path has an ordering of locations along the output path, including two path ends. The model may output the path as a sequence of X and Y coordinates.

In some embodiments, more particularly, to apply the path-type ML-based vascular identifier, each of 50 coordinates along a seed starting path is converted to a profile image, and the profile images stacked so that a 2-D image is created. Each profile image comprises pixels perpendicular to the vessel direction and passing through the selected coordinate. In the profile image, the true vascular path extends generally along the seed starting path, but it "wiggles". The ML-based vascular identifier operates by moving seed path coordinates laterally to positions which are considered more likely to actually lie upon the vascular path (optionally also somewhat constrained by the lateral positioning of nearby points, to maintain at least some amount of contiguity). Optionally, this is performed on an interpolated image, e.g., so that 200 or more (for example, 210) interpolated points are generated. Since the positions of points along the lateral lines are known in the original 2-D image, the laterally moved positions can be mapped back into 2-D image coordinates to give the 2-D shape of the vascular path. Optionally, remapping uses fewer points than were available in the interpolated intermediate image; for example, remapping may return to 50 selected anchor points, and draw the vascular path between anchor points. Anchor points may be connected by straight lines, by spline fits, or by another method.

It may be noted that identifications of paths 401, 402 substantially overlap with the mask identifications made in FIGS. 3D, 3B, respectively. In some embodiments, pixels in the sub-tree masks of FIGS. 3H, 3F are divided into their main vessel vs. branch vessel types based on comparison with paths 401, 402 additionally, or alternatively to, comparison with the mask-type outputs of FIGS. 3D, 3B. This is a form of cross-vascular identifier mixing of outputs which combines outputs of path-type ML-based vascular identifiers and of mask-type ML-based vascular identifiers.

Cross-Type Repair Using ML-Based Vascular Identifiers

Figure 5A:
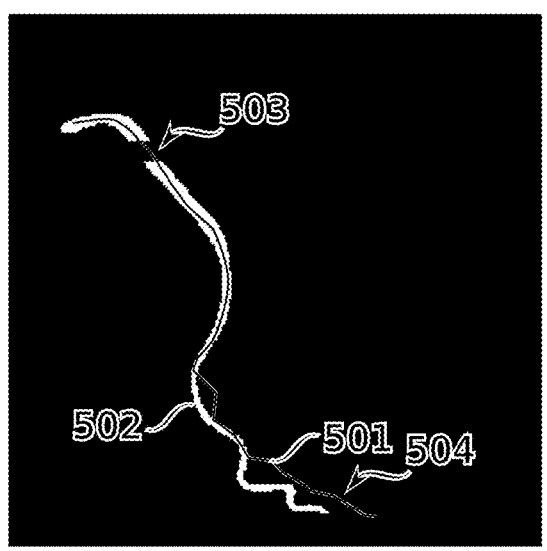
FIGS. 5A-5B schematically represent a method of vascular identification repair using mixed path-type and mask-type ML-based vascular identifiers, according to some embodiments of the present disclosure.
Figure 5B:
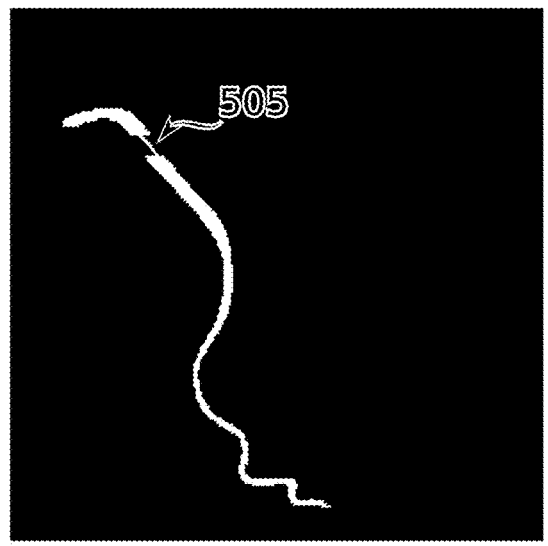

Reference is now made to FIGS. 5A-5B, which schematically represent a method of vascular identification repair using mixed path-type and mask-type ML-based vascular identifiers, according to some embodiments of the present disclosure.

In FIG. 5A are shown two overlying LCX identifications produced as outputs of ML-based vascular identifiers. Path 501 represents an output of a path-type ML-based vascular identifier, while mask 502 is the output of a mask-type vascular identifier. Each output includes at least one error. Gap 503 is an error in mask 502, such as may be caused, for example, by a lesion which interferes with contrast agent intensity and/or vascular morphology (the gap has been artificially introduced for purposes of explanation).

Path 501 crosses over gap 503. Path-type ML-based vascular identifiers can be relatively resistant to local irregularities, since (for example) if there is "normal" vasculature on either side of the gap, the processes of regression will tend to match the path to those normal regions. The region in-between will be bridged as a matter of course, in order to maintain the overall integrity of the path.

However, tail region 504 of path 501 diverges from mask 502. In some embodiments, deviations of mask 502 and path 501 near the tail 504 are treated as more likely (and optionally necessarily) due to errors in the path 501. The reason for this may be, for example: that path 501 may be constrained by an over-learned feature such as a limitation on how tortuous the path is allowed to be; a relatively increased sensitivity to small collateral branches; and/or in general a vulnerability to falling into local minima which tends to propagate along the path once an error occurs (previous path dependence).

FIG. 5B illustrates a corrected vascular identification combining mask 502 and path 501. The tail region 504 can be deleted, for example, because in some portion (most distally) it leaves but never rejoins a portion of mask 502, or because (slightly more proximally) it leaves and rejoins mask 502, but it rejoins the same self-connected "blob", and so is not bridging any gap.

In contrast, bridge 505 is retained, for example based on the criterion that two different (not previously interconnected) blobs are bridged. Additionally, or alternatively, other criteria are applied, for example, a maximum bridging distance and/or similarity of directionality between a skeletonized version of mask 502 and regions of path 501 extending alongside.

ML-Based Vascular Identifier Repair by Combination Example

Reference is now made to FIGS. 6A-6H, which depict an X-ray angiogram image (depicted in each of FIGS. 6A, 6C, 6E, and 6G) together with different mask-type ML-based vascular identifier outputs (FIGS. 6B, 6D, 6F, 6H) corresponding to different anatomically distinct vascular types, according to some embodiments of the present disclosure. FIG. 6B shows an LAD mask, FIG. 6F shows an LCX mask, FIG. 6D shows a mask comprising the LAD sub-tree (the LAD and its diagonals or branches), and FIG. 6H shows a mask comprising the LCX sub-tree (the LCX and its marginals or branches). In this example, FIGS. 6D and 6F each show significant gaps in the detected mask, compared to what can be seen in the X-ray angiogram image.

Further reference is made to FIG. 6J, which shows two superimposed path-type ML-based vascular identifier outputs 601, 602, according to some embodiments of the present disclosure. Path 601 extends along the LCX, and path 602 extends along the LAD. However, path 602 has mostly been misidentified; it has "jumped" to a wrong vessel.

Additional reference is made to FIG. 6K, which shows a segmented result 603, produced based on the use of the various correct and partially incorrect information available from the ML-based vascular identifier outputs shown in FIGS. 6B, 6D, 6F, 6H, and 6J, according to some embodiments of the present disclosure.

In some embodiments, the rules of combination which result in the segmentation of FIG. 6K are as already described for the simpler cases before. Path-type segmentation portions which leave but never return to a corresponding mask-type segmentation of the image may be disregarded in the final result. However, where gaps have been spanned by a path-type output result to join two otherwise disconnected mask-type "blobs", the result can be unified into a single segment. Although this is not illustrated, segments can also be distinguished from each other by knowing which anatomically defined vascular type(s) are being identified by each mask-type or path-type ML-based vascular identifier.

ML-Based Vascular Identifier Repair by Combination and Heuristics Example

Figure 7A:
FIGS. 7A, 7B, 7C and 7D depict an X-ray angiogram image (depicted in each of FIGS. 7A and 7C) together with different mask-type ML-based vascular identifier outputs (FIGS. 7B, 7D) corresponding to different anatomically distinct vascular types, according to some embodiments of the present disclosure.
Figure 7B:
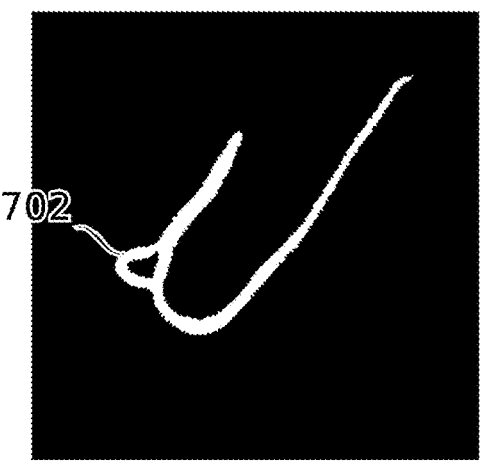
Figure 7C:
Figure 7D:
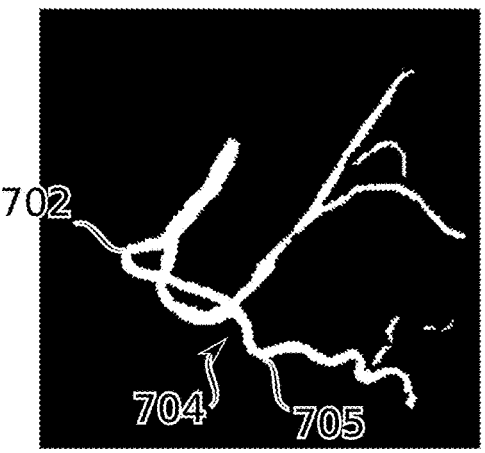
Figure 7E:
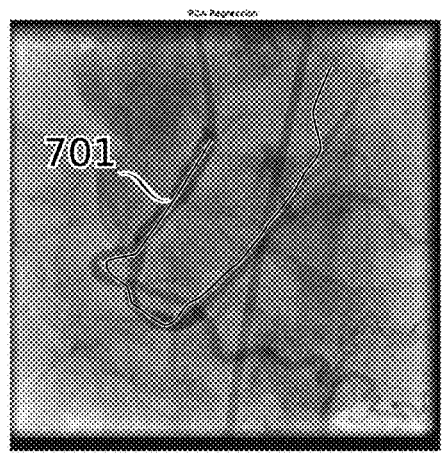
FIG. 7E shows a path-type ML-based vascular identifier output superimposed on the image of FIGS. 7A-7C, according to some embodiments of the present disclosure.
Figure 7F:
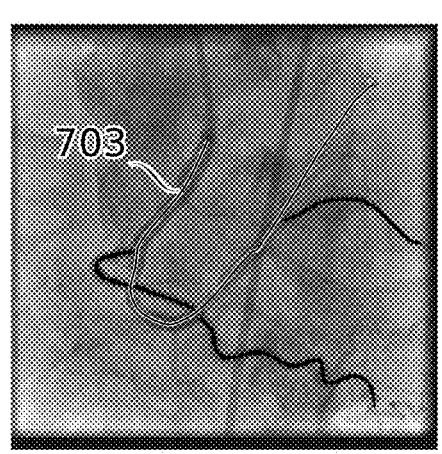
FIG. 7F shows a segmented result, produced based on the use of the various correct and partially incorrect information available from the ML-based vascular identifier outputs shown in FIGS. 7B, 7D, and 7E, modified by further constraints, according to some embodiments of the present disclosure.

Reference is now made to FIGS. 7A-7D, which depict an X-ray angiogram image (depicted in each of FIGS. 7A and 7C) together with different mask-type ML-based vascular identifier outputs (FIGS. 7B, 7D) corresponding to different anatomically distinct vascular types, according to some embodiments of the present disclosure. FIG. 7B shows an RCA mask, and FIG. 7D shows a mask comprising the RCA sub-tree (the RCA and its diagonals or branches). Further reference is made to FIGS. 7E, which shows a path-type ML-based vascular identifier output 701 superimposed on the image of FIGS. 7A-7C, according to some embodiments of the present disclosure. Additional reference is made to FIG. 7F, which shows a segmented result 703, produced based on the use of the various correct and partially incorrect information available from the ML-based vascular identifier outputs shown in FIGS. 7B, 7D, and 7E, modified by further constraints, according to some embodiments of the present disclosure.

In FIG. 7B, the mask-type ML-based vascular identifier of the RCA yields an erroneous loop 702, which is due to a branch of the RCA crossing back in front of or behind the RCA itself. The error also appears in the ML-based vascular identifiers which produced the outputs of FIGS. 7D and 7E, so that they do not have the information needed to correct each other. However, the basic information that there is an error can be derived from the pattern in FIG. 7B, since the ML-based vascular identifier there is supposed to identify just a single vessel, and a single vessel should not have any such loop 702.

Nonetheless, the error can be resolved, based on mask morphology. For example, the mask of FIG. 7B can be subjected to skeletonization, allowing the locations of bifurcation (top of loop 702) and crossing (bottom of loop 702) to be identified. Moving away from those intersection locations, the width of the mask can be identified perpendicular to directions along which the skeletonized mask extends. Of the two branch choices, the branch that better matches the pre-branch (or post-branch) width may be considered as the more likely extension of the RCA. Additionally, or alternatively, intensities in the original image may be used to help assess similarity of vascular morphology. Optionally, locations of bifurcation vs. crossing are distinguished by the extra darkening due to cross-over of vessels that generally is not present at a branch point.

Additionally, or alternatively, the directionality of the two loop branches may be determined leading toward the locations so bifurcation/crossing. Again, this directionality may be determined from a skeletonized version of the mask. The loop branch for which directionality is most nearly parallel to the pre- and/or post-loop branch of the mask may be considered as the more likely extension of the RCA.

In this example, an analysis such as just described allows assigning the short side of loop 702 as part of the RCA itself. This in turn allows assignment of remaining vascular portion identifications based on the ML-based vascular identifier output, for example, to yield the vascular segmentation 703 shown in FIG. 7F.

It should be understood that the analysis just described is heuristic in character. Heuristics, while often valuable, tend toward a "brittleness", in that they focus on a particular metric which is assumed to mean something (e.g., mean something about vascular geometry), even though in realistic circumstances, it might not always guarantee what is being assumed for it.

Even with a plurality of heuristics, there can arise situations wherein the heuristics are contradictory, or even agree but yield an incorrect result. Accordingly, there is a potential advantage to reducing the number of ambiguities which need to be resolved heuristically by shifting as much of the vascular segmentation and identification burden as possible to a detector such as an ML-based vascular identifier which is relatively specialized, on one hand (e.g., specialized to detect a particular target type), but also relatively robust in its ability to weight different image features in order to reach a correct vascular identification. The robustness may arise, for example, from the having been generated from realistic examples far more numerous than an algorithm designer could take into individual consideration.

For example, it is noted that the mask of FIG. 7D could also be used as a basis for rationalizing bifurcations/crossovers into a simply branched (loop-free) structure. However, the situation becomes more complex because there are additional logical possibilities that must be excluded. For example, in the example shown, a single RCA branch loops twice across the RCA itself. But near the second crossing 704, the RCA somewhat constricts, so that from width alone, it may be ambiguous whether the RCA really continues straight across, or else begins a tortuous region by curving to the right. The directionality heuristic might yield a different result, but this results in a potential deadlock unless one of the two heuristics is given priority.

In this case, the directionality heuristic would be correct, but it is not generally infallible. It may be noted, for example, that the bend which a bend to the right at crossing 704 would require is similar in angle to the angle of the next downstream tortuosity 705 in the branched vessel. Should both RCA branch and RCA begin a tortuous region near the region of their closest approach, the directionality heuristic could yield an incorrect result.

Thus, an algorithm designer using a formula-based heuristic approach needs to decide how to prioritize or weight heuristics. Rigorous determination of the correct method of comparison may be impractical, for example due to uncertainty about how relatively important given heuristic weaknesses are. A machine-learned vascular identifier has the advantage of being produced by a process of automatic adaptation to actual results.

In short, the more loops which must be resolved using heuristics, the greater is the opportunity for error. In the case of the example of FIGS. 7A-7F, the use of an ML-based vascular identifier specialized for single vessel detection has reduced the number of crossing points requiring heuristic resolution compared to the whole sub-tree ML-based vascular identifier's result.

Transfer of Vascular Orientation from Path-Type to Mask-Type Vascular Identifier Outputs Reference is now made to FIGS. 8A-8E, which schematically illustrate exchange of vascular orientation information from a path-type ML output to a mask-type ML-based vascular identifier output, according to some embodiments of the present disclosure.

Mask-type output as such detects vascular regions in or out of a certain type of blood vessel (e.g., the LAD or the RCA), but is not inherently oriented to determine which end is the ostium (upstream of proximal side of an artery), and which is the distal end of the artery.

Figure 8A:
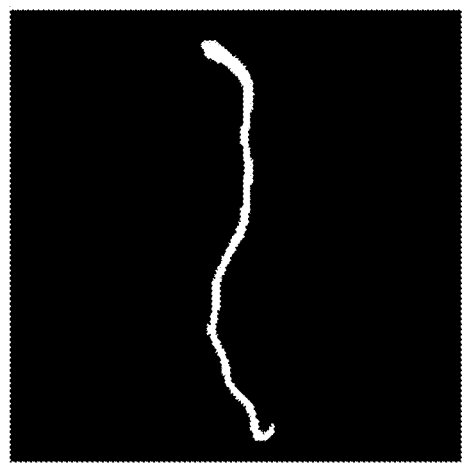
FIGS. 8A, 8B, 8C, 8D and 8E schematically illustrate exchange of vascular orientation information from a path-type ML output to a mask-type ML-based vascular identifier output, according to some embodiments of the present disclosure.
Figure 8B:
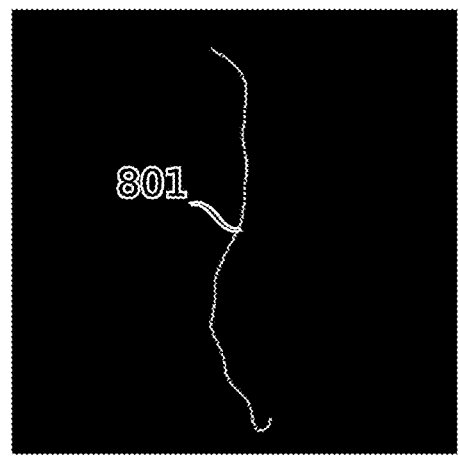

FIG. 8A shows a mask-type ML-based vascular identifier output detecting the extent of an LAD. FIG. 8B is a corresponding path-type ML-based vascular identifier. The path-type vascular identifier output is ended, since it is derived from a path model also having ends. The ends themselves may have been labeled as relatively upstream (ostial) or downstream (distal) based on information implicit in how the paths were learned, and/or based on comparison to the result of yet another vascular identifier, for example, a thresholded Frangi filter heat map, wherein the Frangi filter can be tuned to find larger (and therefore more ostial) blood vessels differentially (e.g., preferentially) compared to smaller blood vessels.

Figure 8C:
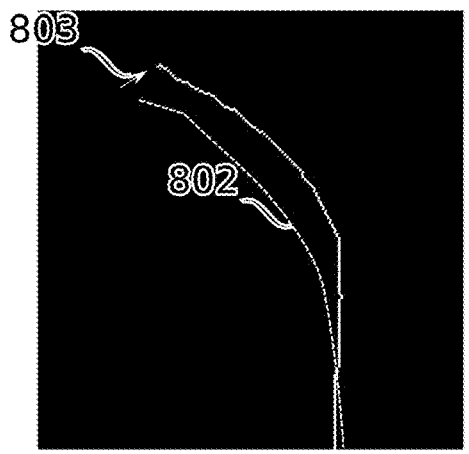
Figure 8D:
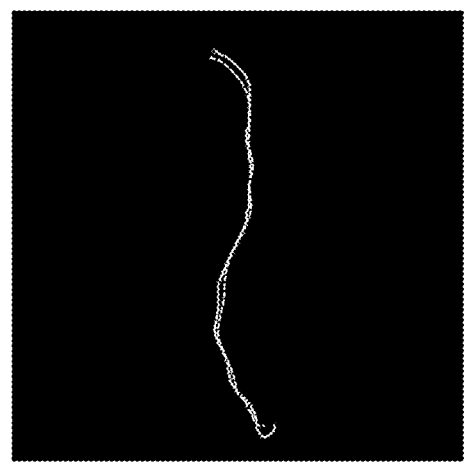

In FIG. 8B, the mask has been skeletonized to skeletonized mask 801, which can be done by an erosion filter. In FIGS. 8C and 8D, a path-type ML-based vascular identifier result 802 is aligned to skeletonized mask 801. FIG. 8C shows a magnified portion from near the ostium end of path-type ML-based vascular identifier result 802. The arrow 803 indicates the distance between the extreme ostial end of path-type ML-based vascular identifier result 802 (for which end information is available), and the closest end of skeletonized mask 801. This end becomes the skeletonized mask's ostial end. The opposite end is the distal end.

Figure 8E:
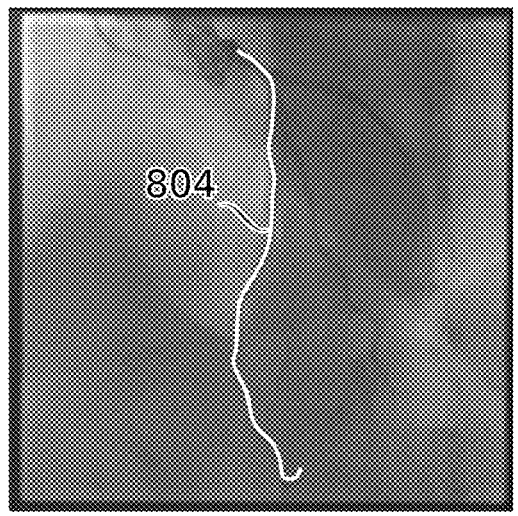

The path of skeletonized mask 801 is optionally used as a representation of the vascular centerline. Alternatively, the skeletonized mask is used to create a geodesic distance transform of the original mask-type output, and the centerline defined as the shortest path along the geodesic transform between the positions of the ostial and distal ends of the skeletonized mask 801. The centerline is then transformed back into Cartesian coordinates, for example as shown in FIG. 8E.

Vascular "Subtraction" in Vascular Masks

Reference is now made to FIGS. 9A-9G, which schematically illustrate a method of performing vascular subtraction between mask-type vascular identifier outputs, according to some embodiments of the present disclosure. In the example shown, the vascular identifier outputs are outputs of two different ML-based vascular identifiers, which distinguish the LAD (FIG. 9A) and the LAD and its diagonals (FIG. 9B), respectively.

Figure 9A:
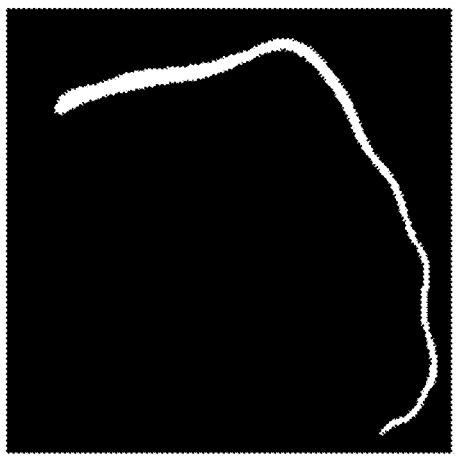
FIGS. 9A, 9B, 9C, 9D, 9E, 9F and 9G schematically illustrate a method of performing vascular subtraction between mask-type vascular identifier outputs, according to some embodiments of the present disclosure.
Figure 9B:
Figure 9C:
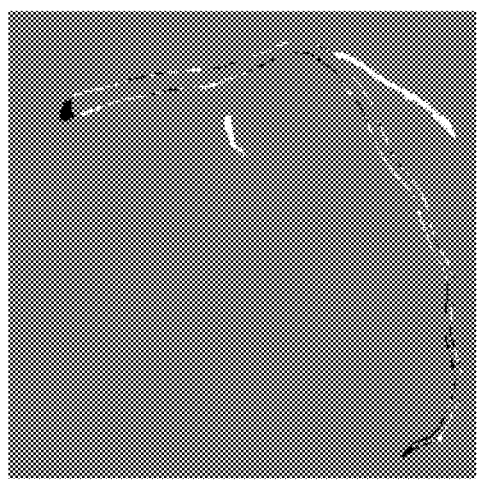

FIG. 9C shows the result of a simple mask subtraction, with bright pixels being those found in the mask of FIG. 9B alone, dark pixels being those found in the mask of FIG. 9A alone, and gray pixels being either found in both masks, or in neither. The subtraction result is unsatisfactory, since it leaves a fringe of mixed black and white pixels where the two ML-based vascular identifiers reached slightly different results as to where the edges of the LAD should be placed.

Figure 9D:
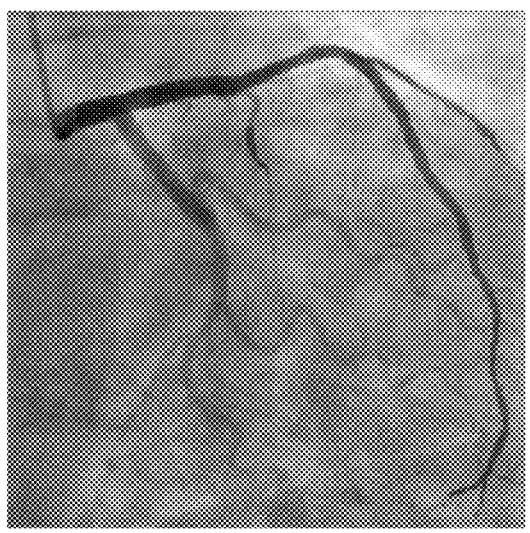
Figure 9E:
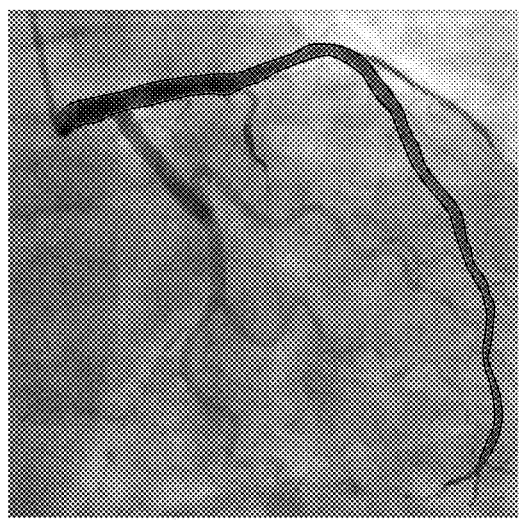
Figure 9F:
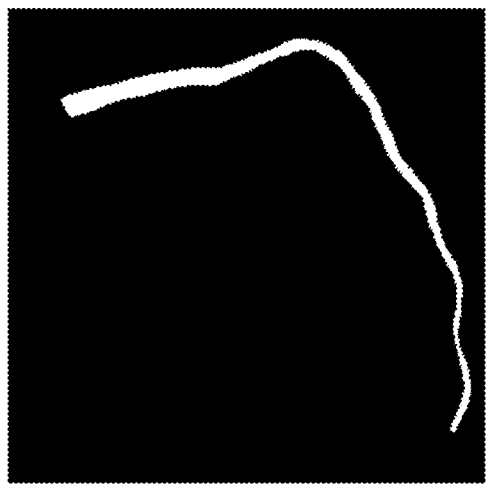
Figure 9G:

FIG. 9D shows the image from which the masks of FIGS. 9A-9B were derived. As a stage of addressing the "fringe" problem, contrast enhancement has been applied to the region of the mask of FIG. 9B. The contours of this enhanced region are shown in FIG. 9E, the contours having been calculated only within the vicinity of pixels which are portions of the LAD (alone) mask. This may be accomplished, for example, by dilating the mask of FIG. 9A until it slightly over-fills contours of the whole enhanced region, and then only retaining contours in contact with the dilated mask. FIG. 9F shows the resulting LAD mask, and FIG. 9G shows the difference mask retaining a branch of the LAD sub-tree.

Example Machine Learning Techniques—Block Diagram/Flowcharts

FIGS. 10A-13 describe examples of determining an optimal image from an image sequence of angiographic images. Similar to FIGS. 2-9G, the description of which is relevant to these figures, the optimal image determination system 100 may perform the techniques described below.

Figure 10A:
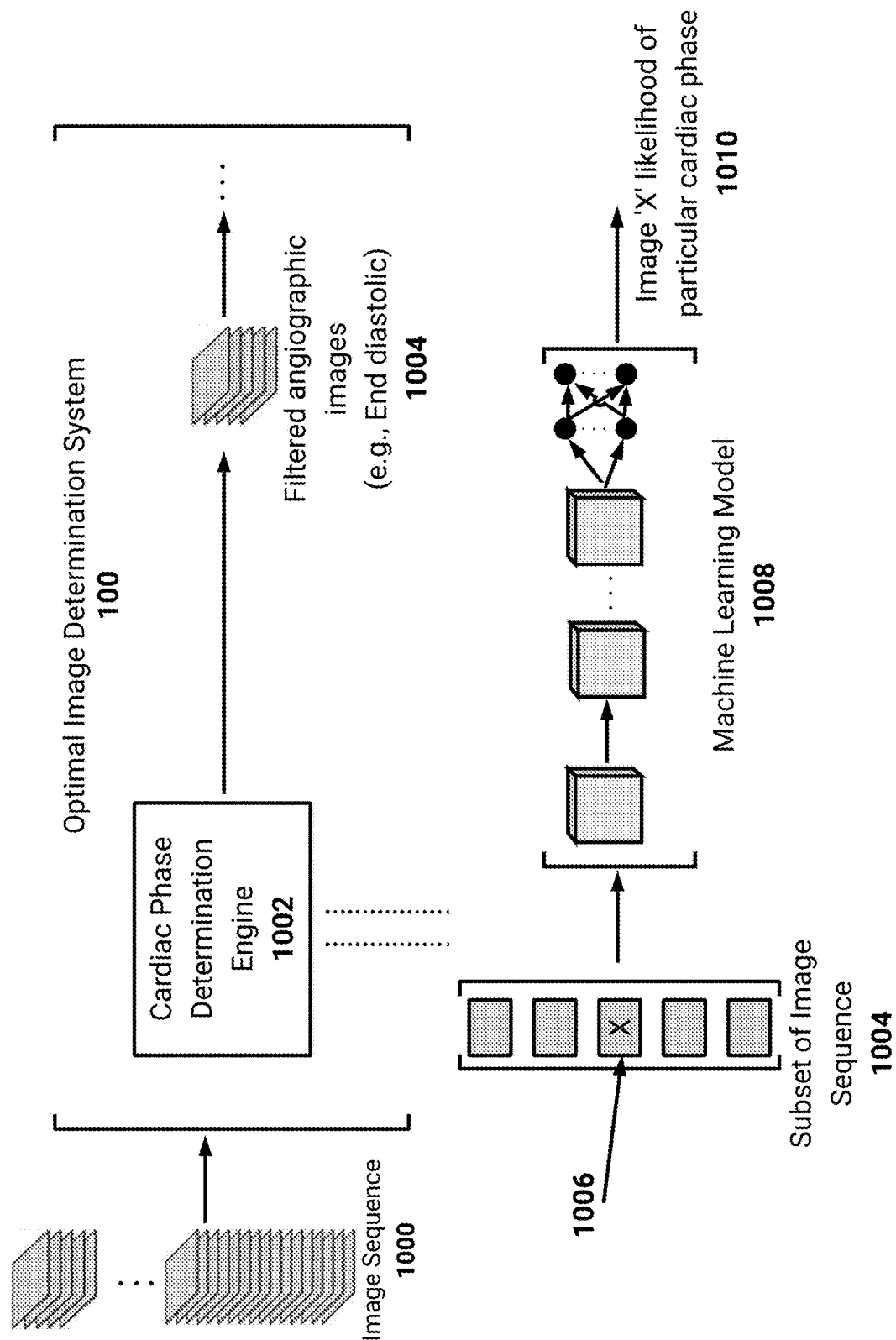
FIG. 10A illustrates a block diagram of the example optimal image determination system filtering angiographic images according to cardiac phase.

FIG. 10A illustrates a block diagram of the example optimal image determination system 100 filtering angiographic images according to cardiac phase. The optimal image determination system 100 operates by filtering an image sequence 1000 to those which include angiographic images associated with a particular cardiac phase. In some embodiments, the system 100 filters the sequence 1000 to include images which are end diastolic.

As illustrated, the optimal image determination system 100 includes a cardiac phase determination engine 1002 which analyses the image sequence 1000. In some embodiments, the cardiac phase determination engine 1002 may be a machine learning model 1008 which receives a subset 1004 of the image sequence 1000 as input. For example, the subset 1004 may include 1 image, 3 images, 5 images, and so on. With respect to 5 images, a center image 1006 may be combined (e.g., concatenated) with two subsequent, and two previous, images in the image sequence 1000.

The system 100 may compute a forward pass through the machine learning model 1008 and obtain a likelihood, or value, associated with the center image 1006 depicting the heart during a particular cardiac phase. In some embodiments, the machine learning model 1008 may represent a neural network which is trained to assign a value indicative of a likelihood (e.g., a final layer may use a sigmoid activation function). With respect to the example of 5 input images, as may be appreciated the neural network may effectively learn to distinguish movement indicia of the heart, such as expansion, which are associated with the particular cardiac phase. The neural network may also be trained to assign a classification associated with a cardiac phase. The neural network may include, for example, a convolutional neural network, a fully-connected neural network, an attention-based network, a recurrent neural network, and so on.

With respect to a recurrent neural network, the model 1008 may be a long short-term memory (LSTM) network. Use of LSTM units may allow the model 1008 to exploit temporal information associated with the image sequence 1000. Additionally, LSTM units may help distinguish vessels and their localization using information about how they change (e.g., move and/or move relative to one another) over time, or simply information about how well another ML-based vascular identifier identifies them in a sequence of images.

As described above, end diastolic images may be preferable as they capture when the blood vessels are at their largest. For example, the cardiac phase corresponds to when the ventricles of the heart are most expanded. This image is relatively identifiable since it occurs during the moments of transition between expansion and contraction of the heart. Therefore, this can assist with matching to other images obtained during later or earlier heartbeat cycles, since there is less likely to be differences in heart shape due to heart contraction.

In the illustrated example, the cardiac phase determination engine 1002 has output filtered images 1004 which are associated with the particular cardiac phase (e.g., end-diastolic images). For implementations which use a likelihood or probability of the particular cardiac phase, the engine 1002 may filter (e.g., remove or discard) images which received a likelihood or probability less than a threshold (e.g., 60%, 75%, 90%).

Figure 10B:
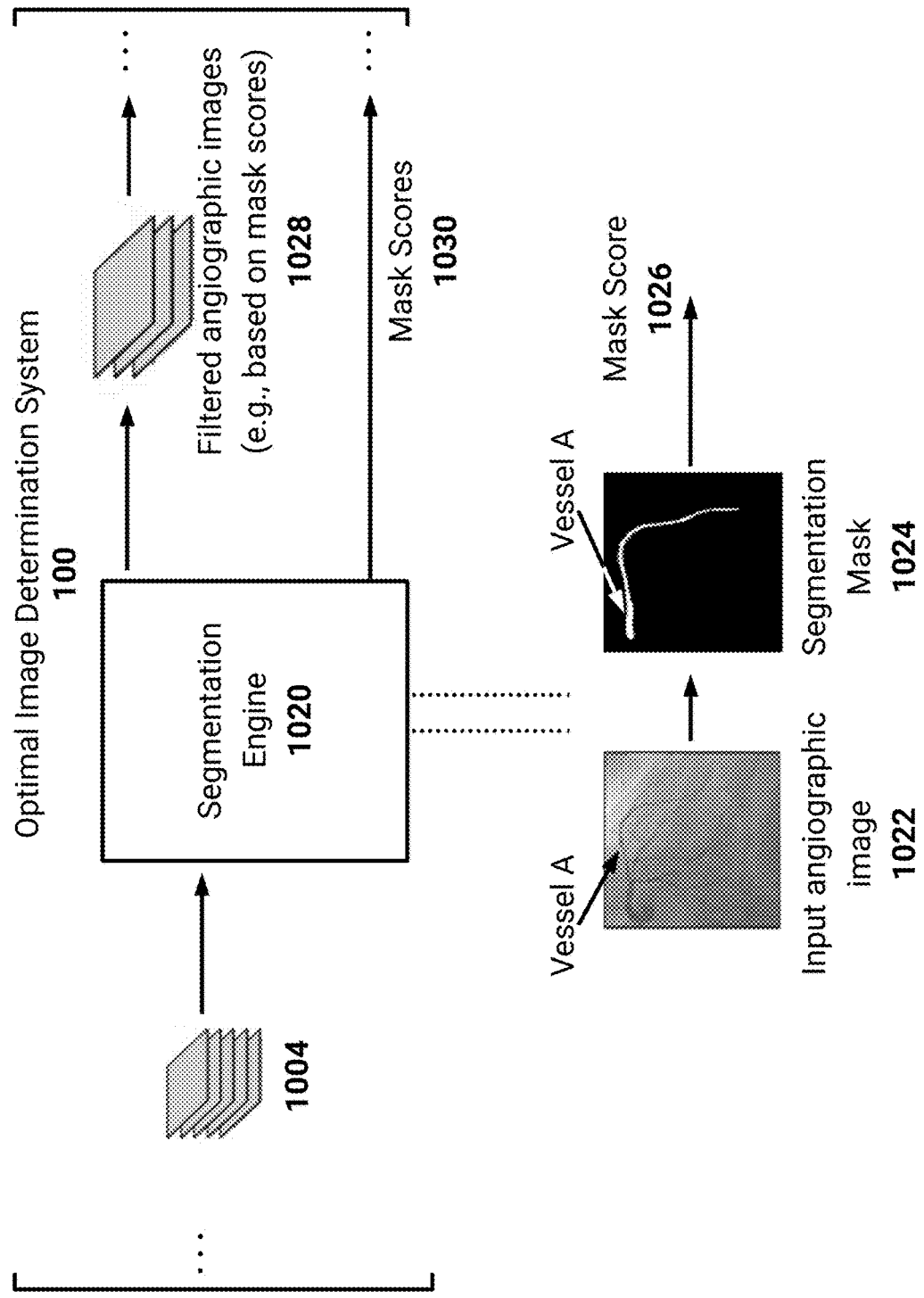
FIG. 10B illustrates a block diagram of the example optimal image determination system performing additional filtering bask on mask scores associated with segmentation masks.

FIG. 10B illustrates a block diagram of the example optimal image determination system 100 performing additional filtering based on mask scores associated with segmentation masks. As described in FIG. 10A, the system 100 may analyze angiographic images included in an image sequence and identify a subset 1004 which depict the heart during a particular cardiac phase (e.g., an end-diastolic phase). As will be described, the system 100 may further refine or filter the subset 1004 using segmentation masks which indicate image portions depicting vessels.

The optimal image determination system 100 includes a segmentation engine 1020 which outputs a segmentation mask based on an input of an angiographic image. For example, in FIG. 10B the segmentation engine 1020 has received an input angiographic image 1022. As illustrated, the input angiographic image 1022 depicts one or more vessels (e.g., 'Vessel A'). The resulting segmentation mask 1024 depicts the one or more vessels, such as Vessel A, as being segmented from the remainder of the image 1022. In some embodiments, the segmentation mask 1024 may include pixels assigned binary values by the segmentation engine 1020. A first binary pixel value, such as white, may indicate that the pixel forms part of a vessel. A second binary pixel value, such as black, may indicate that the pixel does not form part of a vessel.

While FIG. 10B illustrates the segmentation mask 1024, as may be appreciated in some embodiments the segmentation engine 1020 may output information identifying the vessel's location or position in the input image 1022. For example, the engine 1020 may output a data structure (e.g., a vector or other information) which identifies pixels forming a vessel. As another example, the engine 1020 may output information indicating a boundary or contour of a vessel.

The segmentation engine 1020 may represent a machine learning model which is trained to output segmentation masks. For example, a convolutional neural network may be trained to output segmentation 1024. In this example, the convolutional neural network may be trained based on ground truth segmentation masks and associated angiographic images. In some embodiments, the segmentation engine 1020 may represent performance of classical computer vision techniques. As described herein, the neural network may be specific to a side or artery of the heart. For example, a first neural network may output segmentation masks for images associated with a right-side of the heart. As another example, one or more additional neural networks may output segmentation masks for images associated with a particular artery of a left-side of the heart (e.g., a left anterior descending, left marginal, left circumflex artery).

These segmentation masks may be of the mask-type or path-type, as described in FIG. 2. In overview, mask-type outputs comprise "blobs" of connected pixels which are categorized as belonging to a certain vascular type, but not necessarily structured except insofar as their connectivity can be used for further analysis procedures such as skeletonization. Path-type outputs arrange regions along a path in a definite order, typically with the ends themselves also being identified, e.g., as closer to the ostium, or more distal from it (e.g., relatively upstream/downstream, respectively in the case of arteries). Additionally, and as described in FIGS. 2-9G, the segmentation masks may be analyzed to address errors or update information in the masks.

In some embodiments, at least one formula-based method (e.g., classical computer vision technique) is combined with at least one machine-learning based method. For example, a Frangi filter can be utilized in conjunction with the segmentation network to identify smaller unidentified vessels missed by the segmentation network. More particularly, the edgeClearFrangi (ECF) Frangi filter variant may be used. A Frangi filter is a formula-based method used to generate a "heat map" giving a likelihood of given pixels being vascular, and optionally the heat map is converted, for example by application of a threshold, into mask of image pixels judged to be vascular regions. Frames where the Frangi filter is more responsive (e.g., in terms of overall response intensity and/or area of the mask meeting a certain threshold criterion), are correspondingly considered to have greater and/or denser vascular filling with contrast agent. Additionally, the Frangi filter can be used to connect gaps missed by the segmentation network to reduce connectivity problems. Therefore, in addition to reducing connectivity problems that may otherwise remove the image from optimal frame consideration, the Frangi filter will provide an indication to the user that a vessel exists and what its contours are so a user can draw those vessels in post.

Further description related to segmentation masks, and example graphical representations of segmentation masks, are included herein with respect to FIGS. 2-9G. For example, the segmentation engine 1020 may output ML-based vascular identifiers such as different mask type outputs.

Based on the segmentation mask 1024, the segmentation engine 1020 generates a mask score 1026 associated with one or more vessels in the mask 1024. For example, the mask score may indicate a measure or metric associated with a size of Vessel A. In this example, the segmentation engine 1020 may determine a number of pixels which form Vessel A (e.g., a number of the white pixels). The segmentation engine 1020 may also determine an area (e.g., an image area) associated with Vessel A. The segmentation engine 1020 may also determine a length of Vessel A. As an example, the length may indicate a length associated with a line which is positioned through the center of Vessel A (e.g., a centerline).

A segmentation mask may incompletely depict a vessel, for example the segmentation mask may have discontinuities or white portions separated by black portions. In some embodiments, the segmentation engine 1020 may correct discontinuities. For example, the engine 1020 may assign a black portion (e.g., a portion indicated as not forming a vessel) as being a white portion if the black portion is below a threshold size or length and adjacent to white portions on one, or both, sides. To correct discontinuities, as an example, the engine 1020 may apply a Frangi filter to the segmentation mask. Correcting discontinuities is additionally described elsewhere, with respect to FIGS. 3A-9G. In some embodiments, the segmentation engine 1020 may discard certain angiographic images in the subset 1004 from further analysis based on inclusion of such discontinuities. Thus, the engine 1020 may prefer angiographic images which result in segmentation masks with reduced errors.

The segmentation engine 1020 may therefore determine masks 1030 scores for the subset 1004. As described above, a mask score may indicate a size or length associated with a vessel. In some embodiments, an image may have a mask score for each vessel depicted in an associated segmentation mask. In some embodiments, an image may have a single mask score which is based on the vessels depicted in the associated segmentation mask.

Using the mask scores 1030, the segmentation engine 1020 may filter the subset 1004. For example, the segmentation engine 1020 may discard angiographic images which are associated with mask scores less than a threshold percent of a maximum (e.g., higher) mask score. Thus, the segmentation engine 1020 may output filtered angiographic images 1028 along with the mask scores 1030.

Figure 10C:
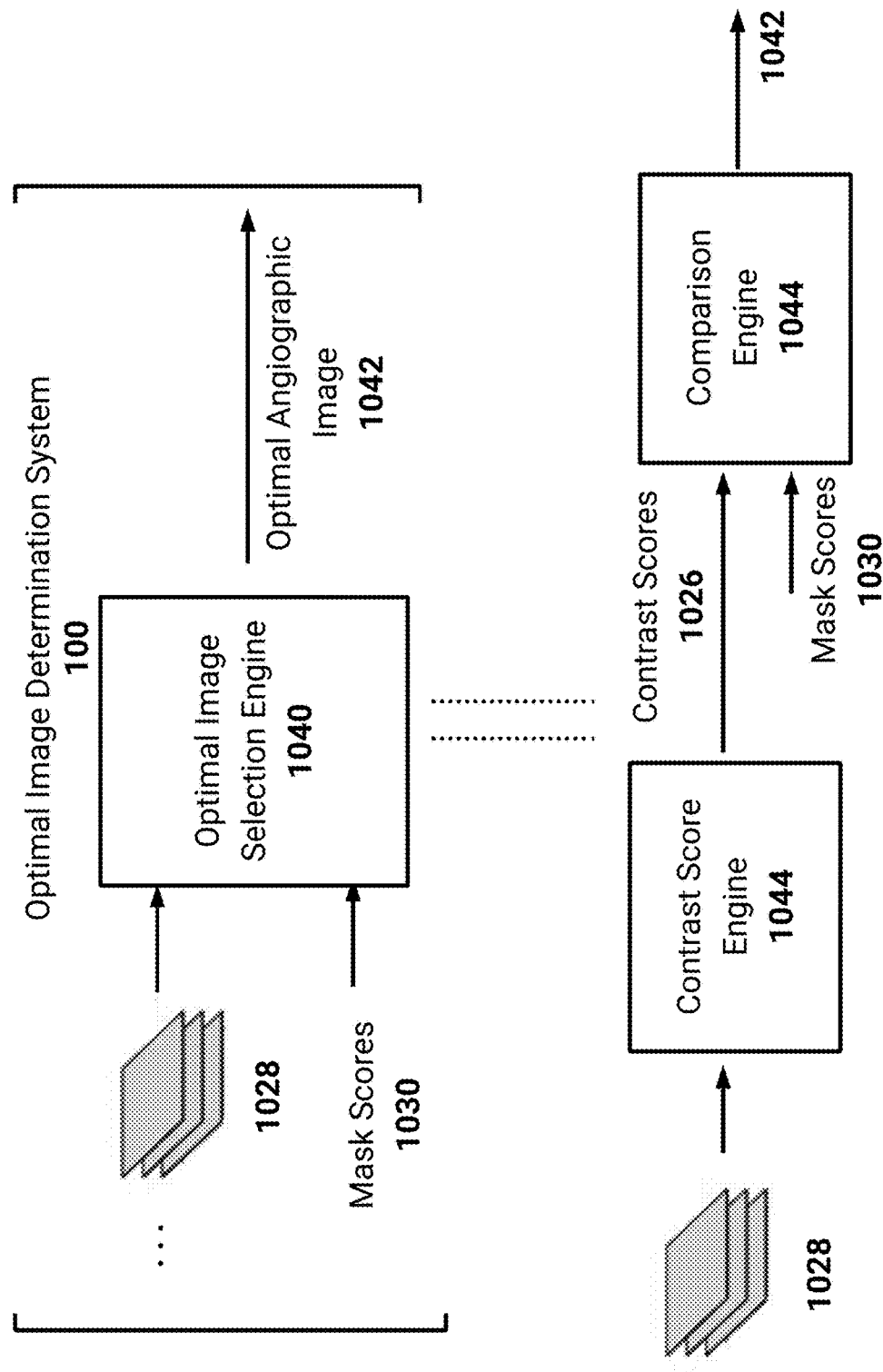
FIG. 10C illustrates a block diagram of the example optimal image determination system generating an optimal angiographic image.

FIG. 10C illustrates a block diagram of the example optimal image determination system 100 generating an optimal angiographic image 1042. As described in FIG. 10B, the system 100 may determine images 1028 whose associated segmentation masks include lengthy, or larger, vessels. These images 1028 may thus more provide a clearer view of the vessels.

The optimal image determination system 100 includes an optimal image selection engine 1040 which determines, or otherwise outputs, the optimal angiographic image 1042. In some embodiments, the optimal angiographic image 1042 represents one of the images 1028 which has the best image quality. For example, the optimal angiographic image 1042 may have the best contrast.

As illustrated, images 1028 are provided to a contrast score engine 1044. The contrast score engine 1044 may register the images 1028, for example aligning the images. As known by those skilled in the art, aligning the images may allow for them to be properly compared. For example, slight movements of the imaging tool (e.g., c-arm) or of the patient may result in slight differences between the viewpoints associated with the images 1028. Thus, the same vessel may be positioned differently in the images 1028.

Subsequent to aligning the images, the contrast score engine 1044 may determine contrast scores 1026 for the images 1028. For example, the angiographic images may be in grayscale. In this example, the engine 1044 may determine a contrast score based on a vessel depicted in one of the images 1028. The contrast score may indicate, for example, an average grayscale value. These contrast scores may be generated based on the same vessel as depicted or included in the images 1028.

As an example, once the images are aligned 1028 a same segmentation mask may be used (e.g., applied) to the images. The segmentation mask may thus identify the vessel in the images 1028 and the contrast scores 1026 may be generated using respective image information for the vessel. In some embodiment's, the segmentation mask may represent a segmentation mask which is a combination, or aligning of, the segmentation masks determined for the images 1028 in FIG. 10B. In some embodiments, the segmentation masks may be aligned and then combined using a logical 'Or' such that the masks may extend beyond vessels depicted in an image. As may be appreciated, the image may thus have a shorter view of the vessels and, as described below, when computing the contrast score the image may have a lower contrast score due to use of additional non-vessel areas which are darker.

A comparison engine 1044 may then identify the optimal angiographic image 1042 based on the contrast scores 1026 and mask scores 1030. For example, the engine 1044 may select image 1042 as being one of the images 1028 with the highest contrast score 1026. This may indicate that the image 1042 has an acceptable size or length of vessel (e.g., as described in FIG. 10B), and has the best image contrast. As another example, the engine 1044 may use a combination of the contrast scores 1026 and mask scores 1030. For example, the scores 1026, 1030, may be weighted and the highest combination may indicate the optimal angiographic image 1042. Optionally, the mask scores 1030 may be used only upon two or more of the images 1028 having contrast scores 1026 within a threshold.

While FIGS. 10A-10C describe use of machine learning models, as may be appreciated a single machine learning model or multiple machine learning models may be used. For example, a single machine learning model may be end-to-end trained to identify an optimal angiographic image based on a received image sequence. As another example, multiple machine learning models may be used to perform different steps. For example, a first model may be used to identify images which are end-diastolic, and a second model may be used to output segmentation masks.

Left-Side/Right-Side Arteries

As known by those skilled in the art, there are two primary coronary arteries—the right coronary artery and the left main coronary artery. The right-side has a main artery, known as the right coronary artery, while the left-side has more than one artery. For example, the left-side bifurcates into the left anterior descending (LAD) artery and the left circumflex artery (LCX). The left circumflex artery has a branch referred to as the left marginal artery (LMA).

In some embodiments, the system 100 may analyze a received image sequence 1000 and identify whether the image sequence 1000 is depicting left-side, or right-side, vessels. For example, the system 1000 may provide each image of the image sequence 1000 to a machine learning model (e.g., a convolutional neural network, optionally with one or more fully-connected layers). The model may output, for each image, respectively probabilities of the depicted vessels being left-side or right-side. The model may also output a classification indicating whether the vessels are left-side or right-side. The image sequence 1000 as whole is determined to depict the right or left side of the heart according to what the majority of the included angiographic images are determined to be. For example, a voting technique may be used to select a side based on whether the majority of the included images are determined to be left-side or right-side.

Thereafter, the system 100 may use the assigning of left-side or right-side to enhance accuracy of its determinations. For example, in some embodiments the system 1000 may use separate machine learning models to determine images which are end-diastolic. In this example, two machine learning models may be trained using training data specific to the left-side or right-side. Similarly, the system 1000 may use separate segmentation networks or models for the left-side or right-side.

With respect to separate segmentation masks, as described above the left-side may have two or more arteries (e.g., the LAD, and LCX or LMA). For the left-side, the system 1000 may therefore generate two or more segmentation masks. In some embodiments, different segmentation networks may be used for the arteries. As described in FIG. 10C, the system 1000 may determine mask scores based on the segmentation masks. For the left-side, the system 1000 may thus determine two or more mask scores for each image. These mask scores may optionally be combined, or aggregated, into a single mask score for the image. The mask scores may optionally be maintained separately and used to filter images as described above. For example, images which have a mask score less than a threshold percent of a maximum mask score may be discarded.

Example Flowcharts

Figure 11:
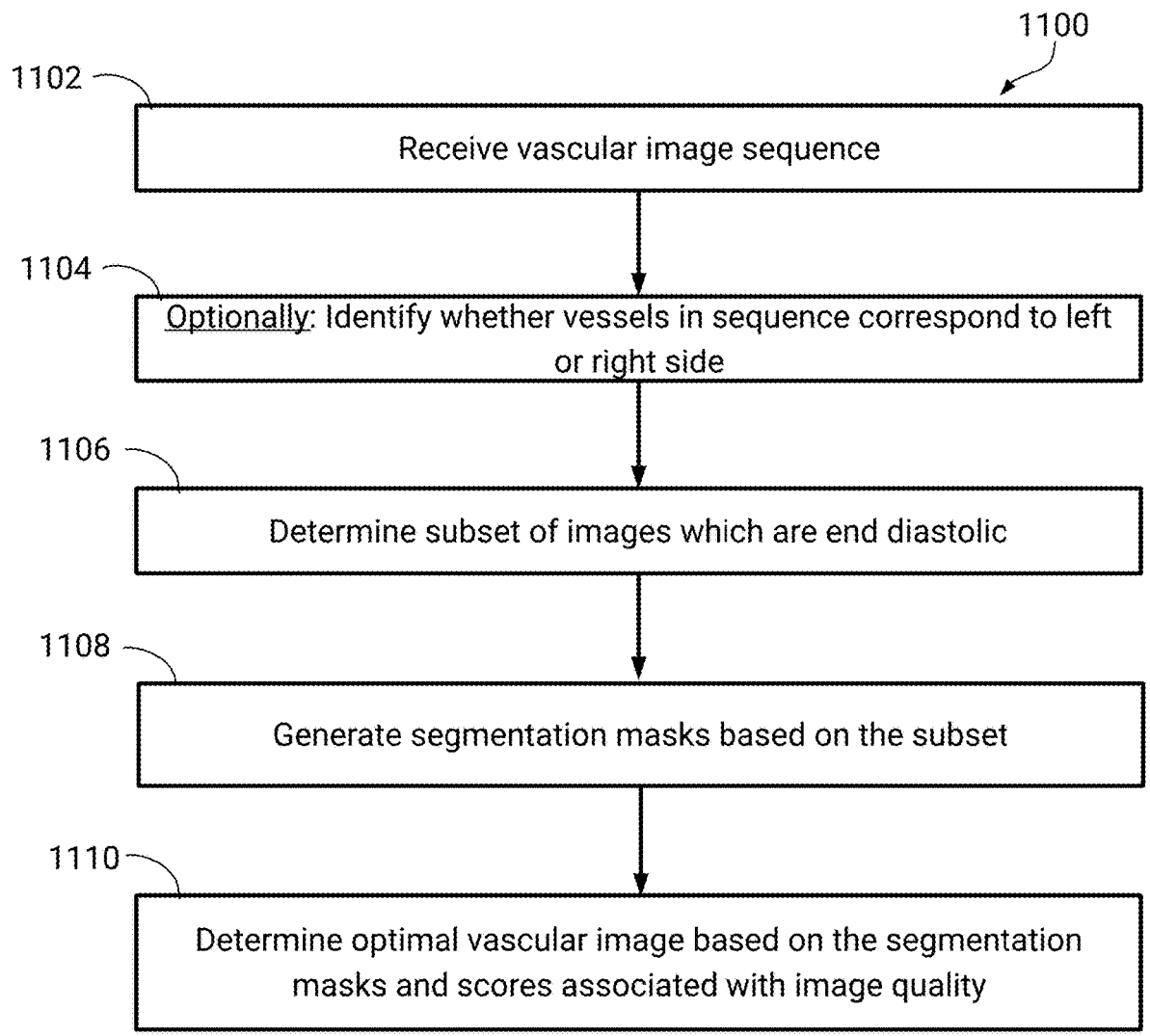
FIG. 11 is flowchart of an example process for determining an optimal angiographic image.

FIG. 11 illustrates is flowchart of an example process 1100 for determining an optimal angiographic image. For convenience, the process 1100 will be described as being performed by a system of one or more computers or processors (e.g., the optimal image determination system 100).

At block 1102, the system receives a vascular image sequence. As described, the system receives vascular images, such as angiographic images, of a portion of a patient's heart. The images may be taken by an imaging system or tool (e.g., a c-arm) at a particular rotation and/or translation about the patient's heart. Thus, the images may be associated with a particular viewpoint of the portion.

At block 1104, the system optionally determines whether vessels in the image sequence correspond to the left-side or right-side of the patient's heart. In some embodiments, a machine learning model (e.g., a convolutional neural network) may be used to effectuate this determination. For example, and as described above, the machine learning model may output values indicative of respective likelihoods that the vessels are included in the left-side or right-side.

At block 1106, the system determines a subset of the vascular images which are end diastolic. As part of identifying an optimal image, and as described in FIG. 10A, the system determines vascular images which are associated with a lengthening and/or relaxing of the vessels of the heart. This cardiac phase, such as end diastolic phase, may allow for enhanced downstream processing of the optimal image. For example, an end diastolic phase image may provide added detail and/or clarity of vessels such that an end-user may more rapidly identify, mark, and so on, vessels in the image. As another example, end diastolic phase images may allow for superior (e.g., less error-prone) three-dimensional modeling.

At block 1108, the system generates segmentation masks based on the subset. As described in FIG. 10B, the system generates segmentation masks to identify vascular images which depict larger and/or lengthier vessels. For example, while taking certain vascular images the dye may not properly fill into the patient's vessels such that certain vascular images may result in less apparent vessels.

The system generates mask scores based on the segmentation masks. For example, the mask scores may indicate a length or size associated with vessels included in the segmentation masks. The system may then filter, such as remove or discard, images which have less than a threshold percentage of a maximum mask score.

As described above, the system may generate a single segmentation mask for a right-side vascular image and two or more segmentation masks for a left-side image. For example, and with respect to the left-side image, the system may generate a first segmentation mask depicting vessels associated with a left anterior descending artery. The system may similarly generate a second segmentation mask depicting vessels associated with a left marginal artery. These segmentation masks may be analyzed separately or combined into a single mask score as described herein.

At block 1110, the system determines the optimal vascular image based on the segmentation masks and scores associated with image quality. The image quality scores, as described in FIG. 10C, may be referred to as contrast scores and indicate measures of contrast quality in the vascular images. An example process to determine a contrast score is described in FIG. 12. As described above, the system may thus select the optimal image as having the best image quality. The system may also select the optimal image as having the best combination of image quality and mask score.

The system may output the optimal vascular image for presentation via an interactive user interface as described in FIG. 1. The end-user may review the determined image and optionally select a different vascular image from the sequence. In some embodiments, such overrides may be used to update the machine learning models described herein.

Figure 12:
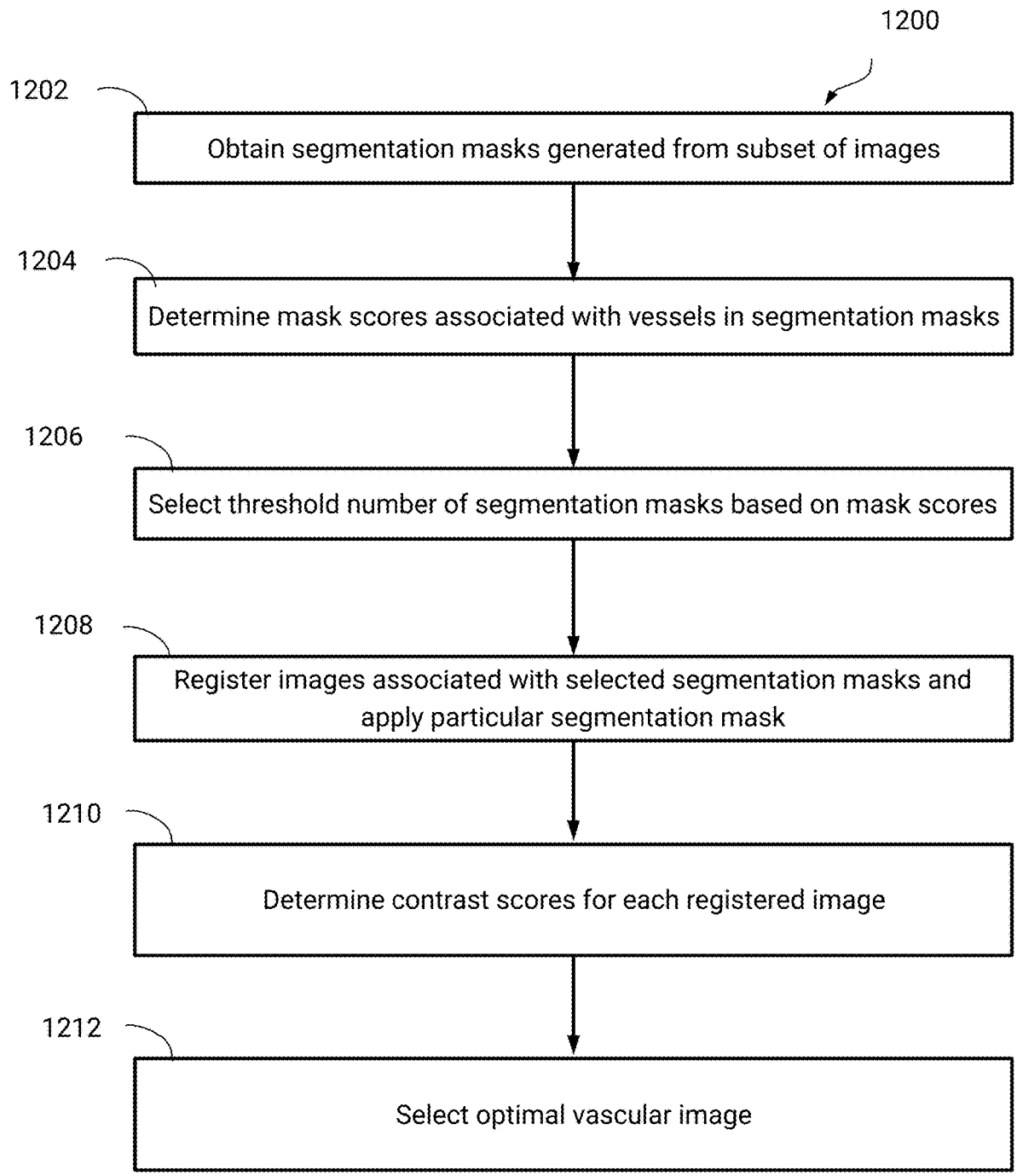
FIG. 12 is a flowchart of an example process for selecting an optimal angiographic image from an image sequence based on contrast scores.

FIG. 12 is a flowchart of an example process 1200 for selecting an optimal angiographic image from an image sequence based on contrast scores. For convenience, the process 1200 will be described as being performed by a system of one or more computers or processors (e.g., the optimal image determination system 100).

At block 1202, the system receives obtains segmentation masks generated from vascular images. At block 1204, the system determines mask scores associated with the vessels depicted in the segmentation masks. At block 1206, the system selects a subset of the vascular images based on the mask scores.

At block 1208, the system registers the subset of vascular images. For example, the system aligns the images (e.g., rotates the images, removes portions of the images, and so on) to allow for the subset to have same features or elements (e.g., vessels) in same portions of the images. The system may generate a particular segmentation mask, such as a combination of the segmentation masks (e.g., a sum of the masks), to be universally applied to the subset. In some embodiments, the particular segmentation mask may be an aligning of the segmentation masks. In some embodiments, the particular segmentation mask may represent a segmentation mask generated from an aligned image.

At block 1210, the system determines contrast scores for the subset of vascular images. The system applies the particular segmentation mask to each image in the subset to identify the vessels depicted therein. The system then determines the contrast score for an image based on the average grayscale value of the pixels which form the vessels depicted in the image. A lower average grayscale value may indicate, in some embodiments, a higher contrast score.

At block 1212, the system selects an optimal vascular image as described at least in FIGS. 10C and 11.

Example System

Figure 13:
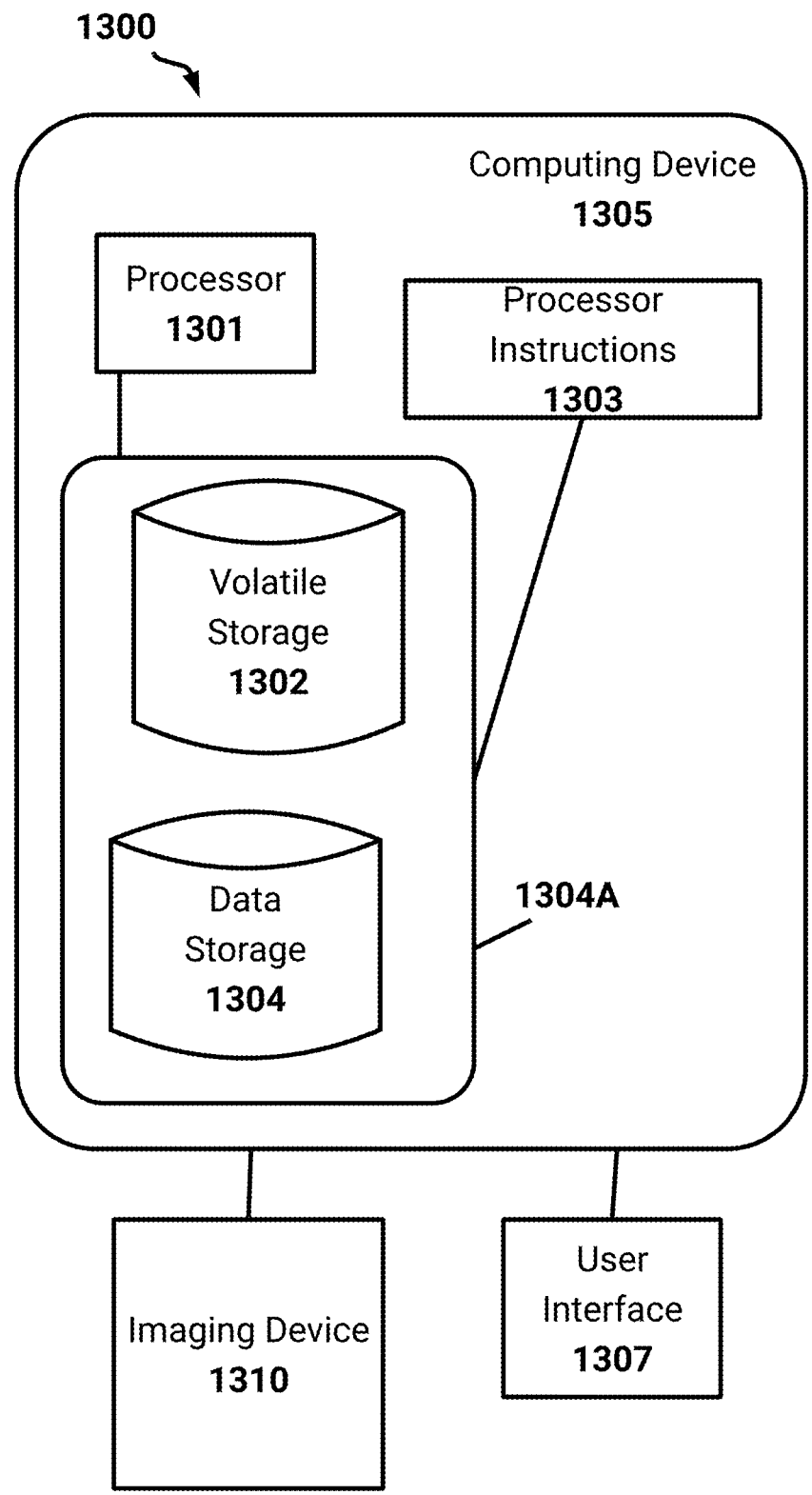
FIG. 13 is an example system which may be used to implement the techniques described herein.

Reference is now made to FIG. 13, which schematically illustrates a system 1300 configured for use in vascular tree segmentation from cardiac images, according to some embodiments of the present disclosure. In some embodiments, the system 1300 may be the system 100 described herein.

Computing device 1305 is a main subsystem of system 1300. Imaging device 1310 may be provided with system 1300 or may be a separately provided imaging device with which system 1300 is interconnected to allow access to cardiac vasculature images generated by imaging device 1310. In some embodiments, imaging device 1310 is an X-ray angiography machine.

Computing device 1305, in some embodiments, comprises processor 1301. Processor 1301 comprises, comprises, collectively, the processing capabilities of the computing device 1305, and does not imply limitation to either a single processing unit, a single enclosure, or a single processing device type. For example, processor 1301 may mix CPU and GPU processing units; processor 1301 is optionally distributed among processing units linked by network connections. Memory 1304A, comprises one or both of volatile storage 1302 and data storage device 1304 (again, these blocks comprise, collectively, available memory capabilities of the computing device). Processor instructions 1303 (stored in memory 1304A) instruct the processor to perform computational aspects of the system's function, for example, computational aspects of one or more of the methods described herein. For example, processor instructions may comprise programming instructions for any one or more of the methods of FIGS. 11 and 12, and/or instructions for performing any one or more of the methods or techniques described in relation to FIGS. 2-9G. Memory 1304A, in some embodiments, encodes a machine learning product which may be a ML-based vascular identifier. In some embodiments, additionally or alternatively, memory 1304A encodes instructions for carrying out a formula-based algorithm.

Optional user interface 1307 is configured, in some embodiments, to support receiving user-specified instructions to the system, and to provide displays and indications of device function, for example, images of cardiac vasculature and/or segmentations thereof.

OTHER EMBODIMENTS

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method of identifying vascular portions of a vascular image, the method comprising:
accessing the vascular image comprising a 2-D angiographic image;
applying a first ML-based vascular identifier to the vascular image to produce a first data structure identifying a path that extends along at least some vascular portions, wherein a vascular portion is an image location associated with part of a blood vessel depicted in the vascular image;
applying a second vascular identifier to the vascular image to produce a second data structure identifying one or more pixel masks, wherein the pixel masks comprise respective blobs of vascular portions;
wherein the path
includes some vascular portions not in the one or more pixels masks; and
combining the first and second data structures to produce a combined identification of vascular portions that form a particular blood vessel depicted in the vascular image, wherein combining is based on:
connection information between the one or more pixel masks and the path, or
similarity of directionality between an individual pixel mask and the path.

2. The method of claim 1, wherein:
the first ML-based vascular identifier is configured is applied to recognize a first anatomically defined vascular type; and
the second vascular identifier is also an ML-based vascular identifier is applied to recognize a second anatomically defined vascular type.

3. The method of claim 2, wherein the first and second anatomically defined vascular types are selected from among the group consisting of: a LAD, other vessels of a LAD sub-tree, a LCX, other vessels of a LCX sub-tree, a RCA, and other vessels of a RCA sub-tree.

4. The method of claim 2, wherein the first and second ML-based vascular identifiers are generated based on training inputs comprising images of and image location indications for the first anatomically defined vascular types and the second anatomically defined vascular types, respectively.

5. The method of claim 1, wherein the first ML-based vascular identifier comprises a network whereof an output layer is a regression layer.

6. The method of claim 1, wherein the second vascular identifier is an ML-based vascular identifier, whereof an output layer is a classification layer.

7. The method of claim 1, wherein the combining comprises:
identifying first and second regions identified by both the first ML-based vascular identifier and the second vascular identifier, and
selecting for inclusion in the combined identification a third region identified by one of the first ML-based vascular identifier and the second vascular identifier, based on the third region extending between the first and second regions.

8. The method of claim 1, wherein at least one of the first and second data structures includes a vascular portion identified erroneously; the method comprising:
determining whether a difference in vascular portion identification between the first and second data structures corresponds to a known error tendency of one of the first ML-based vascular identifier and the second vascular identifier; and
wherein the combining includes including identified vascular portions in the combined identification selectively, according to the identified known error tendency.

9. The method of claim 1, wherein the second data structure omits some vascular portions identified in the first data structure.

10. The method of claim 1, wherein the one or more pixel masks include a first pixel mask and a second pixel mask, and wherein the connection information indicates that the path bridges the first pixel mask and the second pixel mask.

11. The method of claim 1, wherein the connection information indicates that at least a portion of the path has a similar directionality as a skeletonization of the one or more pixel masks, the skeletonization comprising inputting the one or more pixel masks in an erosion filter.

12. The method of claim 1, wherein an image location is a pixel of the vascular image.

13. A system for identifying vascular portions of a vascular image, the system comprising a processor and memory, the memory encoding instructions which cause the processor to:
access the vascular image comprising a 2-D angiographic image;
apply a first ML-based vascular identifier to the vascular image to produce and store in the memory a first data structure identifying a path that extends along at least some vascular portions, wherein a vascular portions is an image location associated with part of a blood vessel depicted in the vascular image;

apply a second vascular identifier to the vascular image to produce and store in the memory a second data structure identifying one or more pixel masks, wherein the pixel masks comprise respective blobs of vascular portions;

wherein the path
- includes some vascular portions not in the one or more pixel masks; and combine the first and second data structures to produce and store in the memory a combined identification of vascular portions that form a particular blood vessel depicted in the vascular image, wherein the combination is based on:
- connection information between the one or more pixel masks and the path, or
- similarity of directionality between an individual pixel mask and the path.

14. The system of claim 13, wherein the first ML-based vascular identifier is applied to recognize a first anatomically defined vascular type, and wherein the second vascular identifier is also an ML-based vascular identifier, and applied to recognize a second anatomically defined vascular type.

15. The system of claim 14, wherein the first and second anatomically defined vascular types are selected from among the group consisting of: a LAD, other vessels of a LAD sub-tree, a LCX, other vessels of a LCX sub-tree, a RCA, and other vessels of a RCA sub-tree.

16. The system of claim 14, wherein the first and second ML-based vascular identifiers are generated based on training inputs comprising images of and image location indications for the first anatomically defined vascular types and the second anatomically defined vascular types, respectively.

17. The system of claim 13, wherein the first ML-based vascular identifier comprises a network whereof an output layer is a regression layer.

18. The system of claim 13, wherein the second vascular identifier is an ML-based vascular identifier, whereof an output layer is a classification layer.

19. The system of claim 13, wherein the instructions furthermore instruct the processor to:
- identify first and second regions identified by both the first ML-based vascular identifier and the second vascular identifier, and
- select for inclusion in the combined identification a third region identified by one of the first ML-based vascular identifier and the second vascular identifier, based on the third region extending between the first and second regions.

20. The system of claim 13, wherein the instructions furthermore instruct the processor to:
- determine a condition wherein at least one of the first and second data structures includes vascular portions identified erroneously;
- determine whether a difference in vascular portion identification between the first and second data structures corresponds to a known error tendency of one of the first ML-based vascular identifier and the second vascular identifier; and
- combine the first and second data structures selectively according to the identified known error tendency.

21. The system of claim 13, wherein the second data structure omits some vascular portions identified in the first data structure.

22. The system of claim 13, wherein the one or more pixel masks include a first pixel mask and a second pixel mask, and wherein the connection information indicates that the path bridges the first pixel mask and the second pixel mask.

23. The system of claim 13, wherein the connection information indicates that at least a portion of the path has a similar directionality as a skeletonization of the one or more pixel masks, the skeletonization comprising inputting the one or more pixel masks in an erosion filter.

24. The system of claim 13, wherein an image location is a pixel of the vascular image.

* * * * *